US009040150B2

(12) United States Patent
Kameyama et al.

(10) Patent No.: US 9,040,150 B2
(45) Date of Patent: May 26, 2015

(54) ACTIVE ENERGY RAY-CURABLE INKJET INK COMPOSITION AND PRINTED MATERIAL USING SAME

(75) Inventors: Yuji Kameyama, Tokyo (JP); Mayuko Okamoto, Tokyo (JP); Yohei Konda, Tokyo (JP); Kazuhiro Jonai, Tokyo (JP); Norio Suzuki, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 14/342,014

(22) PCT Filed: Aug. 29, 2012

(86) PCT No.: PCT/JP2012/071921
§ 371 (c)(1),
(2), (4) Date: Feb. 28, 2014

(87) PCT Pub. No.: WO2013/031871
PCT Pub. Date: Mar. 7, 2013

(65) Prior Publication Data
US 2014/0212634 A1 Jul. 31, 2014

(30) Foreign Application Priority Data

Aug. 29, 2011 (JP) ................................. 2011-186471
Aug. 29, 2011 (JP) ................................. 2011-186472

(51) Int. Cl.
| C09D 11/00 | (2014.01) |
| C09D 11/30 | (2014.01) |
| C09D 11/36 | (2014.01) |
| C09D 11/38 | (2014.01) |
| C09D 11/101 | (2014.01) |
| C09D 11/322 | (2014.01) |

(52) U.S. Cl.
CPC ................ *C09D 11/30* (2013.01); *C09D 11/36* (2013.01); *C09D 11/38* (2013.01); *C09D 11/00* (2013.01); *C09D 11/101* (2013.01); *C09D 11/322* (2013.01)

(58) Field of Classification Search
CPC .... C09D 11/30; C09D 11/101; C09D 11/322; C09D 11/00; C09D 11/38; C09D 11/36
USPC ................ 428/195.1; 106/31.6, 31.77, 31.97
See application file for complete search history.

(56) References Cited

U.S. PATENT DOCUMENTS

| 2002/0086914 A1 | 7/2002 | Lee et al. |
| 2004/0145639 A1 | 7/2004 | Noutary |
| 2008/0200578 A1 | 8/2008 | Noutary |
| 2008/0287563 A1 | 11/2008 | Lee et al. |
| 2008/0295734 A1* | 12/2008 | Deroover ................... 106/31.77 |
| 2009/0085996 A1 | 4/2009 | Kasai |
| 2011/0159251 A1 | 6/2011 | Sato et al. |

FOREIGN PATENT DOCUMENTS

| EP | 1 505 090 | 2/2005 |
| EP | 2 053 102 | 4/2009 |
| EP | 2 399 965 | 12/2011 |
| JP | 6 16762 | 1/1994 |
| JP | 2004 67991 | 3/2004 |
| JP | 2004 514014 | 5/2004 |
| JP | 2004 526820 | 9/2004 |
| JP | 2008-280383 | 11/2008 |
| JP | 2009 83267 | 4/2009 |
| JP | 2009 120628 | 6/2009 |
| JP | 2011 137070 | 7/2011 |
| JP | 2012 116928 | 6/2012 |
| JP | 2012 116933 | 6/2012 |
| JP | 2012 144682 | 8/2012 |

OTHER PUBLICATIONS

Solsperse J100, Hand-out DCRR879 (document by The Lubrizol Corporation), 10 pages, Sep. 2010.
International Search Report Issued Nov. 20, 2012 in PCT/JP12/071921 Filed Aug. 29, 2012.
English translation of the International Preliminary Report on Patentability and Written Opinion issued Nov. 20, 2012, in PCT/JP2012/071921, filed Aug. 29, 2012.
European Search Report issued Mar. 20, 2015 in corresponding European application No. 12828467.6.

* cited by examiner

*Primary Examiner* — Betelhem Shewareged
(74) *Attorney, Agent, or Firm* — Oblon, McClelland, Maier & Neustadt, L.L.P.

(57) ABSTRACT

Provided is an ink composition used in active energy ray-curable inkjet printing, which has excellent curing property, discharge property, storage stability, and compatibility with various substrates. The inkjet ink composition of the present invention includes at least two types of polymerizable compounds selected from a group consisting of (A) 2-(2-vinyloxyethoxy) ethyl acrylate, (B) N-vinyl caprolactam, and (C) at least one type of bifunctional acrylate monomer including at least a diacrylate having a molecular weight of 250 or less.

12 Claims, No Drawings

ACTIVE ENERGY RAY-CURABLE INKJET INK COMPOSITION AND PRINTED MATERIAL USING SAME

CROSS REFERENCE TO RELATED APPLICATIONS

The present application is a 35 U.S.C. §371 national stage patent application of International patent application PCT/JP2012/071921, filed on Aug. 29, 2012, published as WO/2013/031871 on Mar. 7, 2013, the text of which is incorporated by reference, and claims the benefit of the filing date of Japanese application nos. 2011-186471, filed on Aug. 29, 2011, and 2011-186472, filed on Aug. 29, 2011, the text of each of which is also incorporated by reference.

TECHNICAL FIELD

The present invention relates to an ink composition used in active energy ray-curable inkjet printing. The ink composition of the present invention has excellent curing property, discharge property, storage stability, and compatibility with various substrates.

BACKGROUND ART

An inkjet printing system is characterized in that recording of images or characters is performed by attaching liquid microdroplets of an ink composition to a substrate to be printed on, and thereby printing plate is not used in the process of printing. As another printing system which does not use any printing plate, an electrophotographic system is also well known. However, in terms of equipment cost, running cost, printing speed and the like, the inkjet printing system is considered to be superior. For such reasons, there has been an increase in the market demand for on-demand printing in recent years, and the demand is even further expanding.

Compared to an ink composition used in off-set or gravure printing, the ink composition used in inkjet printing is required to have strict viscosity control. This is because the liquid droplet amount at discharging varies in accordance with a change in the viscosity of the ink composition, and as a result, the image quality of a printed material varies. Further, as the inkjet printing system is used all over the world in recent years, an ink composition having as little quality variation as possible like viscosity, that is, excellent stability over time, is required.

Meanwhile, accompanying the performance improvement of an inkjet head in recent years, a shift toward a small lot printing in an existing printing industry draws attention. In the printing industry, productivity is important, and the multi pass system used in a signature field cannot provide the required productivity. For such reasons, in order to have the productivity that is not obtained by the multi pass system, most of the inkjet printing used in the printing industry uses a single pass system having fast printing speed. Compared to the multi pass system, nozzle missing is clearly reflected to the image quality in the single pass system, and thus the ink is required to have an excellent discharge property.

Further, most of the substrates used in a signature industry are a vinyl chloride sheet. However, in the printing industry, various kinds of substrates such as paper-based or film-based substrates exist. Since the adhesiveness or spreading property of the ink varies depending on the types of substrates, the ink is required to have compatibility with various substrates. Further, to cope with fast printing speed and printing on various substrates, an ink with fast curing speed and excellent versatility in terms of adhesiveness onto a substrate is required. From this point of view, an active energy ray-curable ink is preferred most.

However, compared to other types of an inkjet ink composition, it is known to be difficult to control the viscosity or stability over time of the active energy ray-curable inkjet ink composition. That is because, the main component of the active energy ray-curable inkjet ink composition is a polymerizable monomer, and due to a polymerization initiating component generated in a tiny amount during transport or storage, the polymerization reaction of the polymerizable monomer progresses.

In other words, for the development of an active energy ray-curable inkjet ink composition, it is important to have a product quality such as curing property (productivity), discharge property, storage stability, or compatibility with various substrates as advantages.

Until now, various determinations have been made to solve the aforementioned problems. For example, Patent Literature 1 discloses printing ink having low viscosity and good discharge property containing 2-(2-vinyloxyethoxy) ethyl acrylate. However, it is difficult to exhibit a good curing property. In Patent Document 2, N-vinyl lactams are used as a polymerizable monomer and improvement of storage stability is obtained by adding an anti-oxidant or a polymerization inhibitor. However, the ink composition described in Patent Document 2 shows insufficient strength or resistance of a printed material to be obtained by the active energy ray-curable inkjet printing system. Further, although Patent Document 3 discloses a printing method using a single pass system, an excellent curing property is not easily exhibited.

As described above, although various determinations have been made regarding an active energy ray-curable inkjet ink composition, it is a present state that an ink composition satisfying all of the curing property, discharge property, storage stability, and compatibility with various substrates is not obtained yet.

Meanwhile, the active energy ray-curable inkjet ink is known to have better drying property compared to a solvent type ink. For such reasons, the active energy ray-curable inkjet ink is installed in a high speed printing type signage printer or, from the viewpoint of having excellent adhesiveness to a substrate, it is installed in a flatbed type printer having compatibility with various substrates, and a development of an ink blend formulation for each application has been made.

With those printers, printing with large size, thick film, and high density could be achieved by scanning a head. In addition, a head technology for allowing extrusion of liquid microdroplets by high frequency based on recent developments in head technology has been established. With realization of those techniques, there is now a high possibility that the inkjet printing which has been remained unfavorable in terms of productivity and image quality becomes alternative of the existing printing systems, in conjunction with the merit of digitalization. However, for achieving those technological improvements, development of ink having better higher frequency suitability than before and also with low viscosity and high sensitivity is needed. Among them, as a specification required for ink, the low viscosity can contribute to an improvement of shot accuracy and it is important to obtain an image with high definition.

In Patent Document 4, a UV curable-type inkjet ink with low viscosity is suggested. With the disclosed ink, at least low viscosity can be achieved. However, when printing is made with high frequency of 20 kHz, missing printing occurs in accordance with the printing for a long period of time. For such reasons, it is not suitable for printing at practical level, and thus further improvements are needed. Further, a technological handout, that is, Non Patent Document 1, is made available by The Lubrizol Corporation in which determinations of a pigment dispersion having excellent fluidity are made by dispersing several pigments with use of a corresponding dispersing resin. The pigment dispersion using the dispersing resin exhibits excellent fluidity, but for achieving desired ink with low viscosity and high sensitivity, developments of an additional formulation of ink are needed.

PRIOR ART DOCUMENTS

Patent Documents

Patent Document 1: EP Patent Application No. 07119179.5
Patent Document 2: JP 2009-120628 A
Patent Document 3: JP 2009-083267 A
Patent Document 4: JP 2004-526820 A Non-Patent Document Non Patent Document 1: Hand-out DCRR879 (document by The Lubrizol Corporation)

SUMMARY OF INVENTION

Under the circumstances described above, a first embodiment of the present invention relates to an ink composition used in active energy ray-curable inkjet printing, that is, an object thereof is to provide an ink composition having excellent curing property, discharge property, storage stability, and compatibility with various substrates. Further, a second embodiment of the present invention relates to the aforementioned ink composition, that is, an object thereof is to provide an ink composition having excellent high frequency suitability and also low viscosity and high sensitivity.

To solve the aforementioned problems, the present inventors conducted intensive studies regarding a polymerizable compound in an active energy ray-curable inkjet ink composition. As a result, it was found that the aforementioned problems can be solved by an active energy ray-curable inkjet ink composition containing at least two types of polymerizable compounds selected from a group consisting of (A) 2-(2-vinyloxyethoxy)ethyl acrylate, (B) N-vinyl caprolactam and (C) at least one type of bifunctional acrylate monomer including at least a diacrylate having a molecular weight of 250 or less, and the present invention is completed accordingly.

Specifically, the present invention is characterized by the descriptions described below.

(1) An active energy ray-curable inkjet ink composition containing at least two types of polymerizable compounds selected from a group consisting of
  (A) 2-(2-vinyloxyethoxy) ethyl acrylate,
  (B) N-vinyl caprolactam, and
  (C) at least one type of bifunctional acrylate monomer including at least a diacrylate having a molecular weight of 250 or less.

(2) The inkjet ink composition described in the item (1) above, in which the polymerizable compound contains (A) 2-(2-vinyloxyethoxy) ethyl acrylate and (B) N-vinyl caprolactam.

(3) The inkjet ink composition described in the item (2) above, in which the content of (B) N-vinyl caprolactam is 3 to 40% by weight on the basis of the total weight of the ink composition.

(4) The inkjet ink composition described in the item (1) above, in which the polymerizable compound contains all of the components (A) to (C).

(5) The inkjet ink composition described in any one of the items (2) to (4) above, in which the polymerizable compound further contains (D) a polyfunctional acrylate monomer with functionalities of 3 or more.

(6) The inkjet ink composition described in the item (1) above, further containing a pigment and a pigment dispersing agent.

(7) The inkjet ink composition described in the item (6) above, in which the pigment dispersing agent is a fatty acid amine-based dispersing agent.

(8) The inkjet ink composition described in the item (6) above, in which the pigment dispersing agent is a comb type resin dispersing agent containing polyethyleneimine as a main skeleton and a urethane skeleton as a side chain.

(9) The inkjet ink composition described in the item (8) above, in which the urethane skeleton in the comb type resin dispersing agent is composed of a component containing tolylene diisocyanate as an isocyanate component and at least one of propylene glycol and ethylene glycol as an alcohol component.

(10) The inkjet ink composition described in the item (8) above, in which the viscosity at 25° C. is 5 to 14 mPa·s.

(11) The inkjet ink composition described in any one of the items (8) to (10) above, in which the inkjet ink composition contains, as a pigment, at least one selected from a group consisting of PV19, PR122, PR176, PR185, PR202, and PR269 and has magenta color.

(12) The inkjet ink composition described in any one of the items (8) to (10) above, in which the inkjet ink composition contains, as a pigment, at least one selected from a group consisting of PY120, PY139, PY150, PY151, PY155, PY180, and PY185 and has yellow color.

(13) The inkjet ink composition described in any one of the items (8) to (10) above, in which the inkjet ink composition contains, as a pigment, at least one of PB15:3 and PB15:4, and has cyan color.

(14) The inkjet ink composition described in any one of the items (8) to (10) above, in which the pigment is PB7 and has black color.

(15) The inkjet ink composition described in any one of the items (8) to (10) above, in which the pigment contains at least one of PG7 and PG36 and has green color.

(16) The inkjet ink composition described in any one of the items (8) to (10) above, in which the pigment is PO43 and has orange color.

(17) The inkjet ink composition described in any one of the items (8) to (10) above, in which the pigment is PV23 and has violet color.

(18) A printed material obtained by printing with use of the ink composition described in above the item (1) on a substrate.

The disclosure of the present specification relates to the subject matter of Japanese Patent Application Nos. 2011-186471 and 2011-186472 filed on Aug. 29, 2011, and the entire disclosure of which has been incorporated herein by reference.

DESCRIPTION OF EMBODIMENTS

The present invention relates to an active energy ray-curable inkjet ink composition, and the composition is characterized in that it contains at least two types of polymerizable compounds selected from a group consisting of (A) 2-(2-vinyloxyethoxy) ethyl acrylate, (B) N-vinyl caprolactam, and (C) at least one type of bifunctional acrylate monomer including at least a diacrylate having a molecular weight of 250 or less.

As described herein, the term "active energy ray" means an energy ray that is capable of affecting the electron orbital of the polymerizable compound as an object to be irradiated and triggering polymerization reactions of radicals, cations, anions and the like. According to irradiation of the inkjet ink composition of the present invention with active energy ray, polymerization of the polymerizable compound progresses to yield a cured product.

Although not particularly limited, the active energy ray can be electron beam, ultraviolet ray, or infrared ray, for example. When ultraviolet ray is irradiated as the active energy ray, examples of light sources that may be used include high pressure mercury lamps, metal halide lamps, low pressure mercury lamps, ultra-high pressure mercury lamps, ultraviolet lasers, LED, and sunlight.

Hereinbelow, the embodiment of the inkjet ink composition of the present invention is described in more detail.

The first embodiment of the present invention relates to an ink composition containing a polymerizable compound including (A) 2-(2-vinyloxyethoxy) ethyl acrylate and (B) N-vinyl caprolactam, which is used in active energy ray-curable inkjet printing. According to an embodiment in which the combined use of the components (A) and (B) as the polymerizable compound is essential, an ink composition having excellent curing property, discharge property, storage stability, and compatibility with various substrates, which is preferably usable in inkjet printing, can be provided. Hereinbelow, the components for constituting the polymerizable compound are specifically described.

(Polymerizable Compound)
Component (A)

2-(2-Vinyloxyethoxy) ethyl acrylate as the component (A) is a polymerizable monomer containing a vinyl ether group and an acryloyl group as a polymerizable reacting group. 2-(2-Vinyloxyethoxy) ethyl acrylate has characteristics that it is a bifunctional monomer having low viscosity and also relatively fast curing property. Further, it has excellent discharge property at inkjet printing, storage stability, and adhesiveness to various substrates. According to one embodiment of the present invention, the amount of 2-(2-vinyloxyethoxy) ethyl acrylate is preferably in the range of 10% by weight to 95% by weight, and more preferably 10 to 40% by weight, based on the total weight of the inkjet ink composition.

Component (B)

N-vinyl caprolactam as the component (B) is a monomer having excellent discharge property and adhesiveness to various substrates. However, a cured film is not formed with N-vinyl caprolactam only, and thus the curing property and adhesiveness are significantly compromised. As such, in the present invention, by using in combination a polymerizable monomer different from the component (B), an excellent curing property can be exhibited. Although the principle remains unclear, the vinyl group of N-vinyl caprolactam containing a nitrogen group exhibited an excellent reactivity for both the acrylate group and vinyl group. For such reasons, when the component (A) containing a vinyl ether group and an acryloyl group is used as a polymerizable monomer to be used in combination, in particular, cross-linking between an acrylate group and a vinyl group is promoted. As a result, an ink composition having excellent curing property and adhesiveness to various substrates and also an excellent discharge property and storage stability, which has not been achieved until now, can be obtained.

According to the one embodiment of the present invention, content of (B) N-vinyl caprolactam is preferably in the range of 3 to 40% by weight, and more preferably 5 to 35% by weight, based on the total weight of the inkjet ink composition. By having the content of (B) N-vinyl caprolactam in an amount of 3% by weight or more, it becomes easy to have an improvement of the curing property and adhesiveness. Also, by having the content of (B) N-vinyl caprolactam in an amount of 40% by weight or less, it becomes easy to obtain the excellent storage stability.

According to one embodiment of the present invention, the blending ratio between the component (A) and the component (B) is, in terms of (A):(B), preferably in the range of 1:10 to 1:1. By adjusting the blending ratio within the aforementioned range, it becomes easy to achieve various desired characteristics in balance.

Component (C)

In one embodiment of the present invention, it is possible to further contain (C) at least one type of bifunctional acrylate monomer, in addition to the component (A) and (B). According to this embodiment, the curing property of the ink composition can be further enhanced. The content of the bifunctional acrylate monomer is preferably in the range of 5 to 50% by weight, and more preferably 8 to 50% by weight based on the total weight of the inkjet ink composition. By having the bifunctional acrylate monomer in an amount of 5% by weight or more, it becomes easy to obtain the effect of improving the curing property. Also, by having the content in an amount of 50% by weight or less, it becomes easy to obtain the excellent adhesiveness to various substrates.

Examples of the bifunctional acrylate monomer which may be used as the component (C) in one embodiment of the present invention include, but not specifically limited to, ethylene glycol diacrylate, diethylene glycol diacrylate, polyethylene glycol diacrylate, dipropylene glycol diacrylate, 1,6-hexanediol diacrylate, 1,9-nonanediol diacrylate, 1,10-decanediol diacrylate ethoxylated 1,6-hexanediol diacrylate, neopentyl glycol diacrylate, polypropylene glycol diacrylate, 1,4-butane diol diacrylate, tetraethylene glycol diacrylate, 2-n-butyl-2-ethyl-1,3-propane diol diacrylate, hydroxypyvalic acid neopentyl glycol diacrylate, 1,3-butylene glycol diacrylate, tripropylene glycol diacrylate, ethoxylated tripropylene glycol diacrylate, neopentyl glycol modified trimethylol propane diacrylate, stearic acid-modified pentaerythritol diacrylate, neopentyl glycol oligoacrylate, 1,4-butane diol oligoacrylate, 1,6-hexanediol oligoacrylate, ethoxylated neopentyl glycol diacrylate, propoxylated neopentyl glycol diacrylate, tripropylene glycol diacrylate, bisphenol A diacrylate, dimethylol-tricyclodecane diacrylate, propoxylated bisphenol A diacrylate, ethoxylated bisphenol A diacrylate, bisphenol F diacrylate, ethoxylated bisphenol F diacrylate, propoxylated bisphenol F diacrylate, cyclohexane dimethanol diacrylate, dimethylol dicyclopentane diacrylate, isocyanuric acid diacrylate, and propoxylated isocyanuric acid diacrylate. As the component (C), the bifunctional acrylate monomer may be used either singly or in combination of two or more, if necessary.

In one embodiment of the present invention, it is preferable to use, as the component (C), a bifunctional acrylate monomer having a molecular weight of 250 or less. When a bifunctional acrylate monomer having such specific molecular weight is used, it becomes easy to obtain the excellent discharge property at inkjet printing. Although not specifically limited thereto, specific examples thereof include ethylene glycol diacrylate, diethylene glycol diacrylate, dipropylene glycol diacrylate, and 1,6-hexanediol diacrylate. In one embodiment of the present invention, the bifunctional acrylate monomer having a molecular weight of 250 or less may be used either singly or in combination of two or more, if necessary. It is more preferable to use at least diethylene glycol diacrylate. In an embodiment in which diethylene glycol diacrylate is used, content of the diacrylate is preferably in the range of 8 to 50% by weight based on the total weight of the ink composition part.

In one embodiment of the present invention, it is possible to use, as the polymerizable compound, (D) polyfunctional acrylate monomer with functionalities of three or more, in addition to the component (A) to (C) described above. By using a polyfunctional acrylate monomer in combination, physical properties of a cured film such as scratch resistance can be improved. The content of the polyfunctional acrylate monomer which is used as the component (D) is preferably in the range of 1 to 10% by weight based on the total weight of the inkjet ink composition. By having the polyfunctional acrylate monomer in an amount of 1% by weight or more, it becomes easy to obtain the effect of improving the scratch resistance. Also, by having the content in an amount of 10% by weight or less, it becomes easy to obtain the excellent adhesiveness to various substrates.

Examples of the polyfunctional acrylate monomer which may be used as the component (D) in one embodiment of the present invention include, but not specifically limited to, trimethylol propane triacrylate, hydroxypyvalic acid trimethylol propane triacrylate, ethoxylated phosphoric acid triacrylate, pentaerythritol triacrylate, tetramethylol propane triacrylate, tetramethylol methane triacrylate, caprolactone modified trimethylol propane triacrylate, propoxylate glyceryl triacrylate, trimethylol propane oligoacrylate, ethoxylated trimethylol propane triacrylate, propoxylated trimethylol propane triacrylate, ethoxylated isocyanuric acid triacrylate, tri(2-hydroxyethyl isocyanurate)triacrylate, dipentaerythritol hexaacrylate, caprolactone modified dipentaerythritol hexaacrylate, and dipentaerythritol hydroxypentaacrylate. In one embodiment of the present invention, the polyfunctional acrylate monomer may be used either singly or in combination of two or more, if necessary.

Component (E)

In one embodiment of the present invention, it is possible to use, as the polymerizable compound, (E) monofunctional monomer with functionalities of three or more, in addition to the component (A) to (D) described above. Examples of the monofunctional monomer which may be used in the present invention include, but not specifically limited to, isobornyl acrylate, lauryl acrylate, cyclohexyl acrylate, tetrahydrofurfuryl acrylate, 4-t-butylcyclohexyl acrylate, caprolactone-modified tetrahydrofurfuryl acrylate, t-butyl acrylate, isobutyl acrylate, isooctyl acrylate, isostearyl acrylate, stearyl acrylate, isoamyl acrylate, trimethylolpropane formal monoacrylate, trifluoroethyl acrylate, acryloylmorpholine, N-vinylpyrrolidone, hydroxyphenoxyethyl acrylate, hydroxyphenoxypropyl acrylate, 2-hydroxyethyl acrylate, 2-hydroxypropyl acrylate, 4-hydroxybutyl acrylate, 2-acryloyloxypropyl phthalate, carboxylethyl acrylate, benzyl acrylate, methylphenoxyethyl acrylate, 2-phenoxyethyl acrylate (or its ethylene oxide and/or propylene oxide adduct monomer), phenoxy diethylene glycol acrylate, 1,4-cyclohexanedimethanol monoacrylate, N-acryloyloxyethyl hexahydrophthalimide 2-methoxyethyl acrylate, methoxytriethylene glycol acrylate, 2-ethoxyethyl acrylate, 3-methoxybutyl acrylate, ethoxyethoxyethyl acrylate, butoxyethyl acrylate, methoxy dipropylene glycol acrylate, dipropylene glycol acrylate, ethoxylated succinic acid acrylate, and ω-carboxy-polycaprolactone monoacrylate. In one embodiment of the present invention, the monofunctional monomer may be used either singly or in combination of two or more, if necessary.

In one embodiment of the present invention, the ink composition may contain, if necessary, a polymer component referred to as an oligomer or a prepolymer, in addition to the polymerizable compounds described above. Examples of the polymer compound which may be used include, but not particularly limited to, the followings:

"Ebecryl 230, 244, 245, 270, 280/15IB, 284, 285, 4830, 4835, 4858, 4883, 8402, 8803, 8800, 254, 264, 265, 294/35HD, 1259, 1264, 4866, 9260, 8210, 1290, 1290K, 5129, 2000, 2001, 2002, 2100, KRM7222, KRM7735, 4842, 210, 215, 4827, 4849, 6700, 6700-20T, 204, 205, 6602, 220, 4450, 770, IRR567, 81, 84, 83, 80, 657, 800, 805, 808, 810, 812, 1657, 1810, IRR302, 450, 670, 830, 835, 870, 1830, 1870, 2870, IRR267, 813, IRR483, 811, 436, 438, 446, 505, 524, 525, 554W, 584, 586, 745, 767, 1701, 1755, 740/40TP, 600, 601, 604, 605, 607, 608, 609, 600/25TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703, 3702, RDX63182, 6040, and IRR419," all manufactured by Daicel UCB Co., Ltd.;

"CN104, CN120, CN124, CN136, CN151, CN2270, CN2271E, CN435, CN454, CN970, CN971, CN972, CN9782, CN981, CN9893, and CN991," all manufactured by Sartomer Company, Inc., "Laromer EA81, LR8713, LR8765, LR8986, PE56F, PE44F, LR8800, PE46T, LR8907, PO43F, PO77F, PE55F, LR8967, LR8981, LR8982, LR8992, LR9004, LR8956, LR8985, LR8987, UP35D, UA19T, LR9005, PO83F, PO33F, PO84F, PO94F, LR8863, LR8869, LR8889, LR8997, LR8996, LR9013, LR9019, PO9026V, and PE9027V," all manufactured by BASF SE;

"Photomer 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572, and 3660," all manufactured by Cognis Deutschland GmbH & Co. KG;

"Art-Resin UN-9000HP, 9000PEP, 9200A, 7600, 5200, 1003, 1255, 3320HA, 3320HB, 3320HC, 3320HS, 901T, 1200TPK, 6060PTM, and 6060P," all manufactured by Negami Chemical Industrial Co., Ltd.;

"Shikoh UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA, and 2750B," all manufactured by Nippon Synthetic Chemical Industry Co., Ltd.;

"Kayarad R-280, R-146, R131, R-205, EX2320, R190, R130, R-300, C-0011, TCR-1234, ZFR-1122, UX-2201, UX-2301, UX3204, UX-3301, UX-4101, UX-6101, UX-7101, MAX-5101, MAX-5100, MAX-3510, and UX-4101," all manufactured by Nippon Kayaku Co., Ltd.

Hereinabove, one embodiment of the ink composition of the present invention is described. However, the ink composition may also contain various components such as an organic solvent, a polymerization initiator, a sensitizing agent, a coloring agent such as a pigment or a dye, a dispersing agent, a stabilizing agent, or a surface control agent, if necessary. Hereinbelow, embodiments including those various components are described.

In one embodiment of the present invention, the ink composition may also contain an organic solvent. When the ink composition contains an organic solvent, it becomes easy to lower the viscosity of the ink and to enhance the wet spreadability of the ink on the substrate. Examples of the organic solvent include, although not particularly limited, the followings:

glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethyl diglycol, diethylene glycol dialkyl ether, tetraethylene glycol dialkyl ether, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, or dipropylene glycol monomethyl ether butyrate;

glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol acetate dibutyrate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propylene glycol acetate dibutyrate, dipropylene glycol acetate propionate, dipropylene glycol acetate butyrate, dipropylene glycol propionate butyrate, dipropylene glycol dipropionate, or dipropylene glycol acetate dibutyrate;

glycols such as ethylene glycol, diethylene glycol, triethylene glycol, propylene glycol, or dipropylene glycol;

glycol ethers such as ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, or tripropylene glycol monomethyl ether; and lactic acid esters such as methyl lactate, ethyl lactate, propyl lactate, or butyl lactate.

Among them, tetraethylene glycol dialkyl ether, ethylene glycol monobutyl ether acetate, and diethyl diglycol are preferred.

In one embodiment of the present invention, the ink composition may further contain a photoradical polymerization initiator in addition to the aforementioned polymerizable compound. The photoradical polymerization initiator is not particularly limited, and it can be freely selected depending on curing rate, physical properties of a cured coating film, and coloring materials. Among them, in the ink composition according to the present invention, a molecule cleavage type or a hydrogen withdrawing type photoradical polymerization initiator is preferably contained. Examples of the photoradical polymerization initiator which may be preferably used include benzoin isobutyl ether, 2,4-diethylthioxanthone, 2-isopropylthioxanthone, 2,4,6-trimethylbenzoyl diphenylphosphine oxide, 2-benzyl-2-dimethylamino-1-(4-morpholinophenyl)-butan-1-one, bis(2,4,6-dimethoxybenzoyl)-(2,4,4-trimethylpentyl)phosphine oxide, 2-methyl-1-(4-methylthiophenyl)-2-morpholinopropan-1-one, oligo(2-hydroxy-2-methyl-1-(4-(1-methylvinyl)phenyl)propanone), 4-benzoyl-4'-methyl-diphenyl sulfide, 1,2-octanedione, and 1-(4-(phenylthio)-2,2-(O-benzoyloxime)). Those photoradical polymerization initiators are preferred in that the radical generating reaction is not inhibited according to light absorption by magnetic powder or a polymerizable compound and also the curability of the ink composition is increased as it has high efficiency for generating radicals.

Specific examples of the photoradical polymerization initiator other those described above include 1-hydroxycyclohexyl phenyl ketone, benzoin ethyl ether, benzyl dimethyl ketal, 2-hydroxy-2-methyl-1-phenyl propane-1-one, and 1-(4-isopropylphenyl)-2-hydroxy-2-methylpropane-1-one as a molecule cleavage type and benzophenone, 4-phenylbenzophenone and isophthalphenone can be mentioned as a hydrogen-withdrawing type photoradical polymerization initiator.

The photoradical polymerization initiator can be used either singly or in combination of two or more, after considering the wavelength spectrum of active energy ray or light absorption spectrum of a photoradical polymerization initiator.

Further, a sensitizing agent not causing an addition reaction with the polymerizable compound can also be used in combination with the photoradical polymerization initiator. Examples thereof include amines such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, or 4,4'-bis(diethylamino)benzophenone. When the above photoradical polymerization initiator or the sensitizing agent is used, it is preferable to select a compound which has excellent solubility in the ink composition and does not inhibit the ultraviolet transmission.

It is preferable that the content of the photoradical polymerization initiator be in the range of 2 to 25% by weight compared to the total weight of the polymerizable monomers. When the content is 2% by weight or greater, it becomes easy to increase the curing rate. Meanwhile, even when the content is higher than 25% by weight, the curing rate does not change. Thus, by having the content of 25% by weight or less, not only the curing rate can be increased efficiently but also the polymerization initiator can be easily dissolved without having dissolution residuals. Meanwhile, once the dissolution residuals of the polymerization initiator are generated, viscosity of the ink composition tends to increase even when the dissolution residuals are dissolved by applying heat. As a result, a problem of having no discharging due to increased viscosity of the ink composition may be caused, and thus an application to inkjet printing may become difficult.

In one embodiment of the present invention, it is preferable that the ink composition further contain a surface control agent. By adding a surface control agent to the ink composition, the wet spreadability on the substrate can be enhanced. As described herein, the "surface control agent" means a resin capable of lowering surface tension of the ink composition by 0.5 mN/m or more compared to the value before the addition, when added at ratio of 1% by weight on the basis of the total weight of the ink composition of the present invention.

Examples of the surface control agent include, although not particularly limited, "BYK-350, 352, 354, 355, 358N, 361N, 381N, 381, 392, BYK-300, 302, 306, 307, 310, 315, 320, 322, 323, 325, 330, 331, 333, 337, 340, 344, 370, 375, 377, 355, 356, 357, 390, UV3500, UV3510, and UV3570," all manufactured by BYK-Chemie GmbH and; "Tegorad-2100, 2200, 2250, 2500, and 2700," all manufactured by Tego Chemie GmbH. The surface control agent may be used either singly or in combination of two or more, if necessary.

It is preferable that the content of the surface control agent be in the range of 0.001 to 5% by weight on the basis of the total weight of the ink composition. By having the content of 0.001% by weight or more, spreadability can be enhanced due to easy wetting. However, even when it is more than 5% by weight, not all of the surface control agent can be oriented on an ink surface, and thus there is a tendency that only a certain effect is exhibited limitedly.

In one embodiment of the present invention, it is preferable that the ink composition further contain a stabilizing agent. By adding a stabilizing agent to the ink composition, it is possible to enhance the viscosity stability of ink over time, discharge property after time, and viscosity stability on an apparatus within a recording device. Examples of the stabilizing agent which is particularly preferably used include, although not particularly limited, a hindered phenol based compound, a phenothiazine based compound, a hindered amine compound, and a phosphorus based compound. Specific examples are as described below.

Examples of the hindered phenol based compound include "IRGANOX1010, 1010FF, 1035, 1035FF, 1076, 1076FD, 1076DWJ, 1098, 1135, 1330, 245, 245FF, 245DWJ, 259, 3114, 565, 565DD, and 295" all manufactured by BASF SE, "BHT SWANOX" "NONFLEX Alba, MBP, EBP, CBP, BB" and "TBH," all manufactured by Seiko Chemical Co., Ltd., "AO-20, 30, 50, 50F, 70, 80, and 330" all manufactured by Adeka Corporation, "H-BHT" manufactured by Honshu Chemical Industry Co., Ltd., and "Yoshinox BB, 425, and 930" all manufactured by API Corporation.

Examples of the phenothiazine based compound include "phenothiazine" manufactured by Seiko Chemical Co., Ltd., "phenothiazine," "2-methoxyphenothiazine," and "2-cyanophenothiazine" all manufactured by Sakai Chemical Industry Co., Ltd.

Examples of the hindered amine based compound include "IRGANOX 5067" and "TINUVIN 144, 765, 770DF, 622LD" all manufactured by BASF SE, "NONFLEX H, F, OD-3, DCD, LAS-P" "Stearer STAR" "Diphenylamine" "4-Aminodiphenylamine" "4-Oxydiphenylamine" all manufactured by Seiko Chemical Co., Ltd., "HO-TEMPO" manufactured by EVONIK DEGUSSA GmbH, and "FANCRYL 711MM and 712HM" all manufactured by Hitachi Chemical Company, Ltd.

Examples of the phosphorus based compound include "triphenylphosphine" and "IRGAFOS 168, 168FF" all manufactured by BASF SE and "NONFLEX TNP" manufactured by Seiko Chemical Co., Ltd.

Examples of other compound include "IRGASTAB UV-10, 22" manufactured by BASF SE, "Hydroquinone," "Methoquinone," "Toluquinone," "MH," "PBQ," "TBQ," and "2,5-Diphenyl-p-benzoquinone" all manufactured by Seiko Chemical Co., Ltd., "Q-1300, and 1301" manufactured by Wako Pure Chemical Industries, Ltd. and "GENORAD 16, 18, and 20" manufactured by RAHN AG.

Among them, from the viewpoint of solubility in the ink and the color feel of the stabilizing agent itself, "BHT SWANOX" and "NONFLEX Alba" all manufactured by Seiko Chemical Co., Ltd. and "H-BHT" manufactured by Honshu Chemical Industry Co., Ltd. are preferred as the hindered phenol based compound. As the phenothiazine based compound, "phenothiazine" manufactured by Seiko Chemical Co., Ltd. and "phenothiazine" manufactured by Sakai Chemical Industry Co., Ltd. are preferable. As the hindered amine based compound, "HO-TEMPO" manufactured by EVONIK DEGUSSA GmbH is preferable. As the phosphorus based compound, "triphenylphosphine" manufactured by BASF SE is preferable.

In one embodiment of the present invention, the ink composition may contain a coloring agent. As the coloring agent, dyes and pigments may be used. However, from the viewpoint of the durability of a printed material, pigments can be more preferably used. As for the pigment, a pigment generally used in an ink composition for an application to printing or an application as a paint can be used, and it can be selected depending on desired use including color developing property and light resistance. Examples of the pigment component that can be used include achromatic pigments such as carbon black, titanium oxide and calcium carbonate; and chromatic organic pigments.

Examples of the organic pigments include the followings: insoluble azo pigments such as toluidine red, toluidine maroon, Hansa yellow, benzidine yellow, and pyrazolone red; soluble azo pigments such as lithol red, Helio Bordeaux, pigment scarlet, and permanent red 2B; derivatives of vat dyes such as alizarin, indanthrone, and thioindigo maroon; phthalocyanine-based organic pigments such as phthalocyanine blue and phthalocyanine green; quinacridone-based organic pigments such as quinacridone red and quinacridone magenta; perylene-based organic pigments such as perylene red and perylene scarlet; isoindolinone-based organic pigments such as isoindolinone yellow and isoindolinone orange; pyranthrone-based organic pigments such as pyranthrone red and pyranthrone orange; thioindigo-based organic pigments; condensed azo-based organic pigments; benzimidazolone-based organic pigments; quinophthalone-based organic pigments such as quinophthalone yellow; isoindoline-based organic pigments such as isoindoline yellow; naphthol-based organic pigments: and other pigments such as flavanthrone yellow, acylamide yellow, nickel azo yellow, copper azomethine yellow, perinone orange, anthrone orange, dianthraquinonyl red, and dioxazine violet.

Examples of the organic pigments as indicated by their Color Index (C.I.) numbers include the followings:

C. I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, and 185;

C. I. Pigment Orange 16, 36, 43, 51, 55, 59, and 61;

C. I. Pigment Red 9, 48, 49, 52, 53, 57, 97, 122, 123, 149, 168, 177, 180, 185, 192, 202, 206, 215, 216, 217, 220, 223, 224, 226, 227, 228, 238, 240, and 269;

C. I. Pigment Violet 19, 23, 29, 30, 37, 40, and 50;

C. I. Pigment Blue 15, 15:1, 15:3, 15:4, 15:6, 22, 60, and 64;

C. I. Pigment Green 7 and 36; and

C. I. Pigment Brown 23, 25, and 26.

Specific examples of the carbon black include the followings:

"Special Black 350, 250, 100, 550, 5, 4, 4A, 6," and "Printex U, V, 140U, 140V, 95, 90, 85, 80, 75, 55, 45, 40, P, 60, L6, L, 300, 30, 3, 35, 25, A, G" all manufactured by Degussa AG; "REGAL 400R, 660R, 330R, and 250R," and "MOGUL E, L" all manufactured by Cabot Corp.;

"MA7, 8, 11, 77, 100, 100R, 100S, 220, 230" "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95, #260" all manufactured by Mitsubishi Chemical Corp.

Specific examples of titanium oxide include the followings:

"TIPAQUE CR-50, 50-2, 57, 80, 90, 93, 95, 953, 97, 60, 60-2, 63, 67, 58, 58-2, 85," "TIPAQUE R-820, 830, 930, 550, 630, 680, 670, 580, 780, 780-2, 850, 855," "TIPAQUE A-100 and 220," "TIPAQUE W-10," "TIPAQUE PF-740 and 744," "TTO-55(A), 55(B), 55(C), 55(D), 55(S), 55(N), 51(A), 51(C)," "TTO-S-1 and 2," and "TTO-M-1 and 2," all manufactured by Ishihara Sangyo Kaisha Ltd.;

"Titanix JR-301, 403, 405, 600A, 605, 600E, 603, 805, 806, 701, 800, 808," "Titanix JA-1, C, 3, 4, and 5," all manufactured by Tayca Corp.; and "Ti-Pure R-900, 902, 960, 706, and 931," all manufactured by E.I. du Pont De Nemours and Company.

Among the pigments listed above, the quinacridone-based organic pigments, phthalocyanine-based organic pigments, benzimidazolone-based organic pigments, isoindolinone-based organic pigments, condensed azo-based organic pigments, quinophthalone-based organic pigments, isoindoline-based organic pigments and the like are preferred because of their excellent light resistance. The organic pigment is preferably a fine pigment having an average particle size of 10 to 200 nm as analyzed by laser scattering. The fine pigments can be obtained by micronization of the organic pigments, for example. When the average particle size of the pigment is 10 nm or larger, a decrease in light resistance caused by small particle size can be suppressed. Meanwhile, when the average particle size is 200 nm or less, it becomes easy to maintain excellent dispersion stability, and also it becomes easy to suppress the precipitation of the pigment.

Micronization of the organic pigment may be carried out by the method described below. That is, a mixture composed of at least three components such as an organic pigment, a water soluble inorganic salt in an amount equivalent to 3 times or more the weight of the organic pigment, and a water soluble solvent, is prepared as a clay-like mixture, the mixture is strongly kneaded with a kneader or the like for micronization, and then the resultant is introduced into water and stirred with a high-speed mixer or the like to obtain the mixture in a slurry form. Subsequently, filtration and washing of the slurry are repeated to remove the water soluble inorganic salt and the water soluble solvent. During the process of micronization, a resin, a pigment dispersing agent and the like may be added to the mixture.

Examples of the water soluble inorganic salt include sodium chloride and potassium chloride. It is preferable to use these inorganic salts in an amount equivalent to 3 or more times, and preferably 20 or less times, the weight of the organic pigment. When the amount of the inorganic salt is 3 or more times the weight of the organic pigment, a treated pigment having a desired size may be obtained. Also, when the amount of the inorganic salt is 20 or less times the weight of the organic pigment, the washing treatment in the subsequent processes can be facilitated, and efficient obtainment of the organic pigment treated to have a desired size becomes easier.

The water soluble solvent is used in order to make an appropriate clay-like state of the mixture of the organic pigment and the water soluble inorganic salt used as a pulverization aid, and to efficiently carry out sufficient pulverization. There are no particular limitations on the solvent as long as the solvent is soluble in water. However, since the temperature of the system increases during the kneading process, and a state is yielded such that the solvent is easily evaporated, a high boiling point solvent having a boiling point of 120 to 250° C. is preferred from the viewpoint of safety. Examples of the water soluble solvent include, but are not limited to, 2-(methoxymethoxy)ethanol, 2-butoxyethanol, 2-(isopenty-loxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low molecular weight polypropylene glycol.

In the present invention, the pigment is preferably incorporated in a range of 0.1 to 30% by weight based on the total weight of the ink composition, in order to obtain a sufficient concentration and sufficient light resistance.

In one embodiment of the present invention, it is preferable to add, as a coloring agent, a pigment dispersing agent, in order to enhance dispersibility of the pigment and to enhance storage stability of the ink composition. Examples of the pigment dispersing agent that can be used include a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a high molecular weight copolymer, a modified polyurethane, a modified polyacrylate, a polyether ester type anionic surfactant, a naphthalene sulfonic acid-formalin condensate salt, an aromatic sulfonic acid-formalin condensate salt, a polyoxyethylene alkyl phosphoric acid ester, polyoxyethylene nonyl phenyl ether, and stearylamine acetate.

Specific examples of the dispersing agent include "Anti-Terra-U (polyaminoamide phosphate)," "Anti-Terra-203/204 (high molecular weight polycarboxylates)," "Disperbyk-101 (polyaminoamide phosphate and acid ester), 107 (hydroxyl group-containing carboxylic acid ester), 110, 111 (copolymers containing acid groups), 130 (polyamide), 161, 162, 163, 164, 165, 166, 170 (high molecular weight copolymers)," "400," "Bykumen" (high molecular weight unsaturated acid ester), "BYK-P104, P105 (high molecular weight unsaturated acid polycarboxylic acids)," "P104S, 240S (high molecular weight unsaturated acid polycarboxylic acid and silicone systems)," and "Lactimon (long-chain amine, unsaturated acid polycarboxylic acid, and silicone)," all manufactured by BYK-Chemie GmbH.

Other examples include "EFKA 44, 46, 47, 48, 49, 54, 63, 64, 65, 66, 71, 701, 764, and 766," "EFKA Polymer 100 (modified polyacrylate), 150 (aliphatic-modified polymer), 400, 401, 402, 403, 450, 451, 452, 453 (modified polyacrylates), and 745 (copper phthalocyanine-based)," all manufactured by EFKA Chemicals B.V.; "FLOWLEN TG-710 (urethane oligomer)," "FLOWNON SH-290, SP-1000," and "POLYFLOW No. 50E, No. 300 (acrylic copolymer)," all manufactured by Kyoeisha Chemical Co., Ltd.; and "DIS-PARLON KS-860, 873SN, 874 (polymeric dispersing agents), #2150 (aliphatic polyvalent carboxylic acid), #7004 (polyether ester type)," all manufactured by Kusumoto Chemicals, Ltd.

Still other examples include "DEMOL RN, N (naphthalene sulfonic acid-formalin condensate sodium salts), MS, C, SN-B (aromatic sulfonic acid-formalin condensate sodium salts), EP," "HOMOGENOL L-18 (polycarboxylic acid type polymer)," "EMULGEN 920, 930, 931, 935, 950, 985 (polyoxyethylene nonyl phenyl ethers)," and "ACETAMIN 24 (coconut amine acetate), 86 (stearylamine acetate)," all manufactured by Kao Corp.; "SOLSPERSE 5000 (phthalocyanine ammonium salt-based), SOLSPERSE 13940 (polyester amine-based), SOLSPERSE 17000, 24000GR, 32000, 33000, 35000, 39000, and 53000" (fatty acid amine having polyethyleneimine as a main skeleton), "SOLSPERSE J-100" (aliphatic amine having polyethyleneimine as a main skeleton), all manufactured by The Lubrizol Corporation; "Nikkol T106 (polyoxyethylene sorbitan monooleate), MYS-IEX (polyoxyethylene monostearate), and Hexagline 4-0 (hexaglyceryl tetraoleate)," all manufactured by Nikko Chemicals Co., Ltd.; "AJISPER-PB821, 822, 824, 827 and 711," manufactured by Ajinomoto Fine-Techno Co., Inc.; and "TEGO Disper 685" manufactured by Tego Chemie Services.

As a pigment dispersing agent having good stability and excellent discharge property, a basic pigment dispersing agent can be particularly mentioned, and it may be either a linear type or a branched type. More specifically, SOLSPERSE "17000, 24000GR, 32000, 33000, 35000, 39000, 53000, and J100," Ajisper "PB821, 822, 824, 827, 711" can be mentioned among those described above. Among them, the SOLSPERSE series including SOLSPERSE 32000 and SOLSPERSE J-100 are known as a comb type resin dispersing agent which has polyethyleneimine as a main skeleton. In one embodiment of the present invention, it is preferable to use them. More specifically, SOLSPERSE 32000 is as a comb type resin dispersing agent of fatty acid amine which has polyethyleneimine as a main skeleton. SOLSPERSE J-100 is as a comb type resin dispersing agent of aliphatic amine which has polyethyleneimine as a main skeleton.

It is preferable that the pigment dispersing agent be contained in an amount of 0.01 to 10% by weight based on the total weight of the ink composition.

In one embodiment of the present invention, it is preferable that an acid derivative of an organic pigment be blended when dispersing a pigment, in order to further enhance the dispersability of the pigment and storage stability of the ink composition. According to such embodiment, when a basic pigment dispersing agent such as aliphatic amine based compound including fatty acid amine is used as a dispersing agent, the compound becomes a counterpart of the organic pigment, and therefore desirable.

As described above, in an embodiment in which a pigment dispersing agent is contained as a coloring agent in the ink composition, preparation of the ink composition is preferably carried out as follows. First, polymerizable monomers, a pigment dispersing agent, a pigment, and various additives are dispersed well in advance using a conventional dispersing machine such as a sand mill, thereby preparing a liquid concentrate containing a pigment at a high concentration (that is, pigment dispersion). Next, the obtained pigment dispersion is diluted with the remaining polymerizable monomers (that is, components as the polymerizable compound described above), the ink composition is obtained. According to this method, sufficient dispersion can be achieved even in a dispersing process using a conventional dispersing machine. Furthermore, since an excessive dispersion energy is not necessary, and enormous dispersion time is not required, an ink composition having excellent stability can be prepared without having degradation of the raw materials during the dispersion process.

In one embodiment of the present invention, the ink composition may contain, if necessary, various additives such as a surface control agent, a leveling agent, an ultraviolet absorber, or an oxidation inhibitor in addition to the various components exemplified above, in order to increase print suitability or durability of a printed material.

In one preferred embodiment of the present invention, the ink composition contains, as an essential component (A) 2-(2-vinyloxyethoxy) ethyl acrylate and (B) N-vinyl caprolactam, and if necessary, further contains (C) at least one type of bifunctional acrylate monomer including at least dipropylene glycol diamine, (D) a polymerizable compound including a polyfunctional acrylate monomer, a stabilizing agent, a photopolymerization initiator, a surface control agent, and a pigment dispersion. Herein, the pigment dispersion is preferably prepared by using an aliphatic amine compound as a pigment dispersing agent, it is prepared more preferably by using a polyethyleneimine resin dispersing agent. The ink composition according to this embodiment can be prepared by adding and mixing the pigment dispersion to a polymerizable compound, adding and mixing various components such as stabilizing agent and surface control agent, and further adding and dissolving a photopolymerization initiator. At that time, in order to prevent clogging at the head, it is preferable to filter the ink composition, after the photopolymerization initiators are dissolved therein, through a filter having a pore size of 3 µm or less, and preferably a pore size of 1 µm or less.

In one embodiment of the present invention, the ink composition is preferably adjusted such that the viscosity at 25° C. is in the range of 5 mPa·s to 50 mPa·s, more preferably 5 mPa·s to 30 mPa·s, even more preferably 5 mPa·s to 15 mPa·s, and particularly preferably 5 mPa·s to 14 mPa·s. In this range of viscosity, the ink composition exhibits stabilized discharging characteristics in heads, particularly ranging from a head having a conventional frequency of 5 kHz to 30 kHz, or a head having a high frequency of 10 kHz to 50 kHz. Meanwhile, when the viscosity is lower than 5 mPa·s, a decrease in the conformity with discharging may easily occur in a high-frequency head. When the viscosity is higher than 50 mPa·s, a decrease in discharging itself is caused even when a device for lowering viscosity by heating is joined to a head, and thus the discharging may not be obtained at all due to poor discharging stability.

Furthermore, it is preferable that the ink composition of the present invention has conductivity of 10 µS/cm or less in a piezo head and has no electric corrosion in the interior of the head. Furthermore, in a continuous type, it is necessary to adjust conductivity by using an electrolyte, and in this case, it is necessary to adjust the conductivity to 0.5 mS/cm or higher.

The ink composition of the present invention can be preferably used in inkjet printing. Specifically, the ink composition is firstly supplied to the printer head of a printer for the inkjet recording system, and is discharged from the printer head onto a substrate. Thereafter, the ink composition is irradiated with an active energy ray such as ultraviolet ray or an electron beam. Thereby, the ink composition on a printing substrate rapidly cures and can form a printed surface as a result of yielding a cured coating film.

There are no particular limitations on the printing substrate used in the present invention, but examples thereof include plastic substrates such as polycarbonate, rigid polyvinyl chloride, soft polyvinyl chloride, polystyrene, foamed styrol, PMMA, polypropylene, polyethylene, PET, mixtures or modification products thereof; paper substrates such as high-quality paper, art paper, coated paper, and cast coated paper; glass; and metal substrates such as stainless steel.

The second embodiment of the present invention relates to an ink composition containing a pigment dispersion as an essential component. According to this embodiment, the pigment dispersion means those prepared by using a pigment, a pigment dispersing agent, and a polymerizable monomer. The pigment dispersing agent is preferably a basic resin dispersing agent. It is preferable to use, as a dispersing agent, the comb type resin dispersing agent having polyethyleneimine as a main skeleton described in the first embodiment, for example. Structure of the side chain (comb part) in the comb type resin dispersing agent having polyethyleneimine as a main skeleton is not particularly limited. However, from the viewpoint of high frequency suitability, the comb type resin dispersing agent having a urethane skeleton as a side chain is preferable. In a preferred embodiment of the present invention, in particular, a resin type dispersing agent which has polyethyleneimine as a main skeleton and a urethane skeleton as a side chain is preferably used as a pigment dispersing agent. As described herein, the urethane skeleton indicates a condensed skeleton of isocyanate and alcohol. Isocyanate and alcohol are not particularly limited. However, to have more excellent high frequency suitability, it is preferable to use tolylene diisocyanate (TDI) as isocyanate and propylene glycols (PPG) or ethylene glycols (PEG) as alcohol. According to this embodiment, 1 pass curing type active energy ray-curable inkjet ink composition having excellent ejection property when printed at high frequency and high ejection speed can be provided, in particular, compared to conventional cases.

Specific examples of the comb type resin dispersing agent include, as a commercially available product, SOLSPERSE 24000 or 32000 manufactured by The Lubrizol Corporation. They are a comb type resin dispersing agent of fatty acid amine having polyethyleneimine as a main skeleton. Examples of other commercially available product include SOLSPERSE 76500, 76400, and J100 manufactured by The Lubrizol Corporation. They are a comb type resin dispersing agent of aliphatic amine which has polyethyleneimine as a main skeleton and a urethane skeleton introduced to a side chain. Compared to the aforementioned comb type dispersing agent having a non-urethane side chain, they are more preferably used from the viewpoint of obtaining more excellent high frequency characteristics.

Among them, a monomer cut product not containing a solvent like SOLSPERSE J100 can be more preferably used as it has an excellent curing property. Even when monomer cut is needed from the viewpoint of product shape, by selecting, as the polymerizing monomer component used for preparing a pigment dispersion, at least two types of the components selected from phenoxyethyl acrylate, DPGDA (dipropylene glycol diacrylate), 1,9-NDDA (1,9-nonanediol diacrylate), 1,10-DDDA (1,10-nonanediol diacrylate), and VEEA (2-(2-vinyloxyethoxy)ethyl acrylate), ink having not only the curing property but also low viscosity can be prepared.

Addition amount of the urethane branched type polyethyleneimine dispersion resin, which is used as the pigment dispersing agent, is arbitrarily selected within a range in which the desired stability of the pigment dispersion is ensured. Regarding the addition amount of the dispersing resin in one embodiment of the present invention, when the effective component of the dispersing resin is in the range of 25% to 75% per 100 parts of the pigment, a result of having excellent fluidity characteristics of ink is obtained, and therefore desirable. When the addition amount is within the aforementioned range, the discharge rate is relatively fast when compared to a case of having the same drop volume, and image drawing can be achieved with high definition.

In the aforementioned embodiment, the pigment is not particularly limited. A pigment generally used in an ink composition for an application to printing or an application as a paint can be used, and it can be selected depending on desired use including color developing property and light resistance. Examples of the pigment that can be used include achromatic pigments such as carbon black, titanium oxide and calcium carbonate, and chromatic organic pigments. Among them, PV19, PR122, PR176, PR185, PR202, and PR269 (each having magenta color); PY120, PY139, PY150, PY151, PY155, PY180, and PY185 (each having yellow color), PB15:3 and PB15:4 (each having cyan color); PG7, PG36, and PO43 (each having orange color), PV23 (having violet color); PB7 (having black color), and surface-treated titanium oxide have excellent light resistance, and when in combined with the aforementioned resin type dispersing agent, exhibit an excellent dispersing property, and thus have excellent viscosity stability over time even after undergoing a strong pigment dispersing process. As a result, ink with excellent transparency is obtained, and as color reproducibility is improved based on repeated printing, and the surface-treated titanium oxide can be more preferably used.

Further, to obtain good color reproducibility and storage stability of the ink, it is preferable to use, as a magenta pigment, a mixture obtained by suitably mixing PV19, that is, non-substituted quinacridone, and PR122, that is, 2,9-dimethylquinacridone in one embodiment of the present invention. Further, in the embodiment of the present invention, the polymerizable monomer used for preparing the pigment dispersion is not particularly limited, if it has an ethylenic double bond. Examples thereof include an acrylic monomer such as monofunctional acrylic monomer, bifunctional acrylic monomer, and an acrylic monomer with functionalities of 3 or more, or a vinyl monomer, a vinyl ether monomer, and a heterogeneous monomer containing an acryl and a vinyl group in the molecule. The polymerizable monomer can be the same as the components that are described as the polymerizable compound in the ink composition of the first embodiment of the present invention. Among them, to obtain ink with ink viscosity of 5 to 14 mPa·s at 25° C., it is preferable to use a polymerizable monomer having viscosity of 1 to 20 mPa·s.

In one embodiment of the present invention, the viscosity of the ink composition is preferably adjusted to the range of 5 to 14 mPa·s at 25° C. By adjusting the ink viscosity to 5 mPa·s or higher, it becomes easy to obtain an excellent discharge property. Meanwhile, by adjusting the ink viscosity to 14 mPa·s or lower, an excellent discharge accuracy is obtained, and thus it becomes easy to have excellent recognition ratio of letters or bar codes.

As described above, with regard to an embodiment relating to the ink composition containing a pigment dispersion as an essential component, it is preferable that the ink composition contain a polymerizable compound in addition to the polymerization monomer used for preparing a pigment dispersion such that the ink composition can be favorably cured by irradiation of active energy ray. In the embodiment, the polymerizable compound may be the same or different from the embodiments of the polymerizable compound that are described above as the first embodiment of the present invention. In other words, in one embodiment of the present invention, the ink composition preferably contains at least two types of polymerizable compounds selected from a group consisting of (A) 2-(2-vinyloxyethoxy) ethyl acrylate and (B) N-vinyl caprolactam, and (C) at least one type of bifunctional acrylate monomer including at least diacrylate having a molecular weight of 250 or less, a pigment dispersing agent, and if necessary, various components such as a photoradical polymerization initiator and a sensitizing agent. In another embodiment of the present invention, the polymerizable compound may be suitably selected from (D) a polyfunctional acrylate monomer having functionalities of 3 or more, and (E) a monofunctional acrylate monomer, a vinyl monomer, a vinyl ether monomer, and a heterogeneous monomer containing an acryl and vinyl in the molecule, and used.

Although not particularly limited, in one preferred embodiment of the present invention, the ink composition preferably contains at least one of one or more selected from a group consisting of the component (A) VEEA (2-(2-vinyloxyethoxy)ethyl acrylate) and the component (C) DPGDA (dipropylene glycol diacrylate), 1,9-NDDA (1,9-nonanediol diacrylate), and 1,10-DDDA (1,10-nonanediol diacrylate). When the component (C) is used, it is preferable to use at least DPGDA. The ink composition containing, as an essential component, a bifunctional monomer as a polymerizable compound is preferable in that is has high sensitivity and also relatively low viscosity. Further, when the polymerizable compound contains the component (B) vinyl caprolactam, which is a monofunctional monomer, it is preferable in that the ink composition has an excellent curing property and also low viscosity can be achieved. The content of the caprolactam is preferably within 30% by weight blending based on the total weight of the ink composition for stabilized viscosity over time. Further, when guaranteed quality is required for a long period of time, blending at 5 to 20% by weight is more preferably used.

From the viewpoints described above, the ink composition in one preferred embodiment of the present invention preferably has, as an essential component, a polymerizable compound which include (C) at least one type of a bifunctional acrylate monomer including at least dipropylene glycol diacrylate, and if necessary, at least one type of the component (A) and the component (B), a pigment dispersion, and if necessary, various components such as a photoradical polymerization initiator or a sensitizing agent. Although not particularly limited, in one embodiment of the present invention, content of the dipropylene glycol diacrylate is preferably in the range of 8 to 50% by weight based on the total weight of the ink composition.

For curing the ink composition using an UV lamp, a photoradical polymerization initiator can be used in the ink composition. The photoradical polymerization initiator can be freely selected depending on curing speed, physical properties of a cured coating film, and coloring materials. Specific examples thereof which may be preferably used include benzoin isobutyl ether, 2,4-diethylthioxanthone, 2-isopropylthioxanthone, 2,4,6-trimethylbenzoyl diphenylphosphine oxide, 2-benzyl-2-dimethylamino-1-(4-morpholinophenyl)-butan-1-one, bis(2,4,6-dimethoxybenzoyl)-2,4,4-trimethylpentylphosphine oxide, 2-methyl-1-(4-methylthiophenyl)-2-morpholinopropan-1-one, oligo(2-hydroxy-2-methyl-1-(4-(1-methylvinyl)phenyl)propanone), 4-benzoyl-4'-methyl-diphenyl sulfide, 1,2-octanedione, and 1-(4-(phenylthio)-2,2-(O-benzoyloxime)). Among them, a combination of the urethane branched type polyethyleneimine dispersion resin, which is one of preferred dispersing resins of the present invention, and 2,4,6-trimethylbenzoyl diphenylphosphine oxide is preferred due to an excellent curing property. Further, in compliance with the lamp characteristics, it is preferable to mix and use two or more of an initiator.

Further, with regard to the photoradical polymerization initiator described above, a sensitizing agent such as amines which does not cause an addition reaction with the polymerizable compound can be also used. Specific examples of the sensitizing agent include, trimethylamine, methyldimethanolamine, triethanolamine, p-diethylaminoacetophenone, ethyl p-dimethylaminobenzoate, isoamyl p-dimethylaminobenzoate, N,N-dimethyl benzyl amine, and 4,4'-bis(diethylamino)benzophenone.

Hereinabove, explanations are given for the embodiment of the ink composition of the present invention. However, without being limited to the components described above, various additives such as a known leveling agent, an anti-foaming agent, a fluidity modifying agent, a fluorescent brightening agent, a polymerization inhibitor, or an anti-oxidant can be used in the composition as long as the desired quality is satisfied.

If the ink with high sensitivity can be achieved, it is also possible to adjust the viscosity by adding a solvent to the ink composition. As described herein, the solvent indicates a liquid having no reactivity. When a solvent is blended in a large amount, the curing property of the ink composition is lowered, and thus the addition amount is preferably 5% by weight or less compared to the total weight of the ink composition.

Hereinabove, embodiments of the ink composition of the present invention are described. However, it is needless to say that the described embodiments can be modified into many forms within a range that is it not beyond the scope of the present invention. The ink composition of the present invention can be preferably used in an application of inkjet printing. Specifically, the ink composition is firstly supplied to the printer head of a printer for the inkjet recording system, and is discharged from the printer head onto a substrate. Thereafter, the ink composition is irradiated with an active energy ray such as ultraviolet ray or an electron beam. Thereby, the ink composition on a printing substrate rapidly cures and can form a printed surface as a result of yielding a cured coating film.

There are no particular limitations on the printing substrate used in the present invention, but examples thereof include plastic substrates such as polycarbonate, rigid polyvinyl chloride, soft polyvinyl chloride, polystyrene, foamed styrol, PMMA, polypropylene, polyethylene, and PET, and mixtures or modification products thereof; paper substrates such as high-quality paper, art paper, coated paper, and cast coated paper; glass; and metal substrates such as stainless steel.

EXAMPLES

Hereinbelow, the present invention is more specifically described by way of Examples, but the embodiments of the present invention are not intended to be limited to those examples.

Examples 1 to 17 and Comparative examples 1 to 10 that are exemplified below relate to an ink composition containing a pigment dispersion, a polymerizable compound, a stabilizing agent, a surface control agent, and a photopolymerization initiator. Before preparation of the ink composition, various pigment dispersions were prepared as described below.

(Preparation of Pigment Dispersion A)

The Pigment dispersion A was prepared by stirring the following materials using a high-speed mixer or the like until a uniform state was obtained, and then dispersing a mill base thus obtained using a horizontal sand mill for about one hour.

Pigment: Carbon black pigment (manufactured by Degussa AG) "Special Black 350" 30.0 parts Pigment dispersing agent: SOLSPERSE 32000 (manufactured by The Lubrizol Corporation) 6.0 parts Polymerizable monomer: 2-(2-vinyloxyethoxy) ethyl acrylate 64.0 parts (Preparation of Pigment Dispersion B)

Similar to the Pigment dispersion A, the Pigment dispersion B was prepared by stirring the following materials using a high-speed mixer or the like until a uniform state was obtained, and then dispersing a mill base thus obtained using a horizontal sand mill for about one hour.

Pigment: quinacridone pigment (manufactured by ClariantAG) "E5B02" 35.0 parts

Pigment dispersing agent: SOLSPERSE 32000 (manufactured by The Lubrizol Corporation) 10.5 parts Polymerizable monomer: 2-(2-vinyloxyethoxy) ethyl acrylate 54.5 parts (Preparation of Pigment Dispersion C)

Similar to the Pigment dispersion A, the Pigment dispersion C was prepared by stirring the following materials using a high-speed mixer or the like until a uniform state was obtained, and then dispersing a mill base thus obtained using a horizontal sand mill for about one hour.

Pigment: Carbon black pigment (manufactured by Degussa AG) "Special Black 350" 30.0 parts
Pigment dispersing agent: SOLSPERSE 32000 (manufactured by The Lubrizol Corporation) 6.0 parts
Polymerizable monomer: dipropylene glycol diacrylate 64.0 parts (Preparation of Pigment Dispersion D)

Similar to the Pigment dispersion A, the Pigment dispersion D was prepared by stirring the following materials using a high-speed mixer or the like until a uniform state was obtained, and then dispersing a mill base thus obtained using a horizontal sand mill for about one hour.

Pigment: quinacridone pigment (manufactured by ClariantAG) "E5B02" 35.0 parts
Pigment dispersing agent: SOLSPERSE J-100 (manufactured by The Lubrizol Corporation) 10.5 parts
Polymerizable monomer: 2-(2-vinyloxyethoxy) ethyl acrylate 54.5 parts Example 1 to Example 9

1. Preparation of Ink Composition

Using each pigment dispersion which has been prepared above, each component was sequentially added in an order from top to the substrate based on the blending formulation described in Table 1, and mixed while the materials were stirred, and then the mixture was gently mixed until the polymerization initiator was dissolved. Meanwhile, the blending amount of the components described in the table is "parts by weight" in all cases. After that, the obtained mixture was filtered through a membrane filter having a pore size of 1 μm to remove coarse particles, and thus an inkjet ink composition was obtained.

The raw material components of the ink described in Table 1 are as follows.

2-(2-vinyloxyethoxy) ethyl acrylate (manufactured by NIPPON SHOKUBAI CO., LTD.)
N-vinyl caprolactam (manufactured by BASF SE)
dipropylene glycol diacrylate (manufactured by BASF SE)
1,6-hexanediol diacrylate (manufactured by OSAKA ORGANIC CHEMICAL INDUSTRY LTD)
1,9-nonanediol diacrylate (manufactured by OSAKA ORGANIC CHEMICAL INDUSTRY LTD)
tripropylene glycol diacrylate (manufactured by Sartomer Company, Inc.)
trimethylol propane triacrylate (manufactured by Toagosei Company, Limited)
pentaerythritol triacrylate (manufactured by Toagosei Company, Limited)
dipentaerythritol hexaacrylate (manufactured by Toagosei Company, Limited)
Irgacure 819 (manufactured by BASF SE)
Lucirin TPO (manufactured by BASF SE)
Irgacure 369 (manufactured by BASF SE)
KAYACURE BMS (manufactured by Nippon Kayaku Co., Ltd.)
BYK-UV3510 (manufactured by BYK Chemie)
BHT SWANOX (manufactured by Seiko Chemical Co., Ltd.)
phenothiazine (manufactured by Seiko Chemical Co., Ltd.)

2. Inkjet Printing

Next, this inkjet ink composition prepared above was used to perform discharging of an ink composition on various substrates such as coated paper, art paper, matt coated paper, and cast coated paper, for which the surface treatment conditions had been changed, using an inkjet discharging apparatus with Kyocera heads, under the printing conditions of an ink droplet amount of 14 pl and 600×600 dpi. After the discharging, the inkjet ink composition was subjected to UV curing using a single metal halide lamp manufactured by Harison Toshiba Lighting Corp. under the conditions of 140 W/cm, a conveyor speed of 25 to 50 m/min., and a single pass, and thus a coated film (that is, a printed material) was obtained. In addition, the printing and the printed material were subjected to various evaluations according to the method described below.

The print substrates in Table 1 are as follows.
PET: PET K2411, manufactured by Lintec Corporation
PP: OPP 50C, manufactured by Lintec Corporation
Coated paper: OK Top coat+, manufactured by OJI PAPER CO., LTD.
PVC: MD5, manufactured by Metamark.

Example 10 to Example 17

Inkjet ink compositions were prepared according to the blending formulations of Table 2 in the same manner as the ink compositions exemplified in Examples 1 to 9. After that, inkjet printing was performed in the same manner as Examples 1 to 9 by using the obtained ink composition to obtain each printed material. In addition, the printing and the printed material were subjected to various evaluations according to the method described below.

Comparative Example 1 to Comparative Example 10

Inkjet ink compositions were prepared according to the blending formulations of Table 3 in the same manner as the ink compositions exemplified in Examples 1 to 9. After that, inkjet printing was performed in the same manner as Example 1 to 9 by using the resulting ink composition to obtain each printed material. In addition, the printing and the printed material were subjected to various evaluations according to the method described below.

3. Evaluation of Characteristics of Ink Composition

The printing and the printed material using the ink compositions prepared in each example and each comparative example were subjected to various tests that are described below and characteristics are evaluated. The evaluations results are presented in Tables 1 to 3.

(Curing Property Test)

The ink compositions prepared in each example and each comparative example were printed by changing the printing speed, and the degree of curing property was determined based on the printing speed allowing curing of 100% solid printed area by 1 pass. The printed material was examined based on the sense of touch in hands, and the curing state was determined based on no ink smearing on hands. The criteria for evaluation are as follows, and the grade "○" or higher was defined to have good curing property.

(Criteria for Evaluation)
⊙: cured at 50 m/min
○: cured at 37.5 m/min
Δ: cured at 25 m/min
X: not cured at 25 m/min.

(Test for Determination of Surface Wrinkle)

Surface wrinkle occurs due to excess surface curing when internal curing property is insufficient, and it is more likely to occur with black ink, in particular.

By using 100 of the inkjet ink compositions prepared above, a solid printed area was cured at a printing rate of 25 m/min by 1 pass, and surface wrinkle was determined, by visual inspection, whether surface wrinkles due to excessive surface curing occurred on the surface of the printed material. The evaluation criteria were as described below, and the grade "○" or higher was defined to have satisfactory surface wrinkles.

(Criteria for Evaluation)
⊙: Wrinkles do not occur on the surface as caused by poor curing
○: There are slight wrinkles on the surface
Δ: There are some wrinkles on the surface
X: There are significant wrinkles on the surface.

(Discharge Property Test)

With regard to the discharge property, the inkjet ink compositions prepared above were used for printing a nozzle check pattern using an inkjet discharging apparatus with Kyocera heads. After 100,000 times of printing, the nozzle check pattern was printed again, and then the discharge property was evaluated based on the number of nozzle missing. The evaluation criteria were as described below, and the grade "○" or higher was defined to have satisfactory discharge property.

(Criteria for Evaluation)
⊙: No nozzle missing after 100,000 times of printing
○: missing of 1 to 2 nozzles after 100,000 times of printing
Δ: missing of 3 to 5 nozzles after 100,000 times of printing
X: missing of 6 or more nozzles after 100,000 times of printing.

(Scratch Resistance Test)

With regard to the scratch resistance test, the ink jet ink compositions prepared above were used and 100% solid printed area was cured at 25 m/min by 1 pass. Then, the peeling state of the cured film was evaluated by rubbing 10 times the thus obtained cured film with fingernails. The criteria for evaluation are as follows, and the grade "○" or higher was defined to have a good scratch resistance property.

(Criteria for Evaluation)
⊙: No scratch occurred even by rubbing with fingernails and the cured film was not peeled off
○: Although scratch occurred by rubbing with fingernails, the cured film was not peeled off
Δ: When rubbed with fingernails, the cured film was slightly peeled off
X: When rubbed with fingernails, the cured film was easily peeled off.

(Storage Stability Test)

The ink compositions prepared above were added in a portion of 6 mL to a screw tube bottle (volume: 7 mL). After tight sealing, it was kept for 7 days under an environment at 60° C. Then, the viscosity was measured and it was compared to the initial viscosity right after the preparation, and thus the evaluation of the stability over time was made. For the viscosity measurement, TVE25L type viscometer manufactured by TOKI SANGYO CO., LTD was used. Further, the criteria for evaluation are as follows, and the grade "○" or higher was defined to have good storage stability.

(Criteria for Evaluation)
⊙: Viscosity increase after the test over time was less than 5% compared to the initial viscosity
○: Viscosity increase after the test over time was the same as or higher than 5% but less than 10% compared to the initial viscosity
Δ: Viscosity increase after the test over time was the same as or higher than 10% but less than 15% compared to the initial viscosity
X: Viscosity increase after the test over time was the same as or higher than 15% compared to the initial viscosity.

(Adhesiveness Test)

For the adhesiveness test, the inkjet ink compositions prepared above were used. 100% solid printing was performed with a size of 1.5 cm×1.5 cm, and the printed area was cured at printing speed of 25 m/min by 1 pass. The obtained cured film was attached with a Cellophane adhesive tape, and then the top surface was rubbed with an eraser to secure sufficient adhesion of the Cellophane adhesive tape to the applied surface. Then, according to peeling of the Cellophane adhesive tape at 90°, the adhesiveness was determined from the degree of adhesion of the film to the substrate after the peeling. Further, the criteria for evaluation are as follows, and the grade "○" or higher was defined to have good adhesiveness.

(Criteria for Evaluation)
⊙: The tape peeled area was less than 1%
○: The tape peeled area was the same as or higher than 1% but less than 10%
Δ: The tape peeled area was the same as or higher than 10% but less than 25%
X: The tape peeled area was the same as or higher than 25%
–: Evaluation cannot be made as no cured film was formed.

As it can be seen from Tables 1 and 2, Examples 1 to 17 are an example in which 2-(2-vinyloxyethoxy) ethyl acrylate and N-vinyl caprolactam are contained, and good results were obtained for any one of the curing property, surface wrinkle, discharge property, scratch resistance property, storage stability, and adhesiveness.

Examples 1 and 2, and 5 to 17 are examples in which N-vinyl caprolactam was contained at 5 to 35% by weight, and both of the storage stability and curing property thereof were in a grade of "⊙" or higher, and thus a very good result of evaluation was obtained.

In Examples 9 to 17, a bifunctional acrylate monomer is used in combination and it is very good in terms of surface wrinkle. Further, in Examples 9, 11 to 15 and 17, the amount of the bifunctional acrylate monomer is 8 to 50% by weight, and the good adhesiveness is maintained while it is very good in terms of the surface wrinkle. Further, in Examples 9 to 12, 15, and 17, a bifunctional acrylate monomer having molecular weight of 250 or less is used, and the good discharge property is maintained while having the surface wrinkle of "⊙".

In Examples 15 to 17, a polyfunctional acrylate monomer is used in combination and the scratch resistance is very good. Further, in Examples 15 and 17, the amount of the polyfunctional acrylate monomer is more than 1% by weight but less than 10% by weight and the good discharge property and adhesiveness are maintained while maintaining very good scratch resistance.

Meanwhile, as it can be seen from Table 3, in Comparative examples 1, 2, 7, and 9, 2-(2-vinyloxyethoxy) ethyl acrylate was used but N-vinyl caprolactam was not contained, thus the curing property and scratch resistance property were poor. Further, in Comparative example 10, the curing property was improved by using in combination 2-(2-vinyloxyethoxy) ethyl acrylate and the polyfunctional acrylate monomer, but the discharge property and adhesiveness were significantly deteriorated.

In Comparative examples 3 and 8, N-vinyl caprolactam was used but 2-(2-vinyloxyethoxy) ethyl acrylate was not contained, thus the curing property, scratch resistance property, storage stability, adhesiveness were significantly deteriorated. Further, in Comparative example 3, only N-vinyl caprolactam was used as a polymerizable monomer, and thus it was impossible to form a cured film.

In Comparative examples 4 to 6, 2-(2-vinyloxyethoxy) ethyl acrylate and N-vinyl caprolactam are not used, and thus all of the curing property, surface wrinkle, scratch resistance property, discharge property, and adhesiveness are not good.

Based on the results described above, it was confirmed that, in order to obtain an ink composition having excellent curing property, discharge property, storage stability, and compatibility with various substrates, using an active energy ray-curable inkjet ink composition containing 2-(2-vinyloxyethoxy) ethyl acrylate and N-vinyl caprolactam is an essential condition.

TABLE 1

Examples 1 to 9

|  |  | Example 1 | Example 2 | Example 3 | Example 4 | Example 5 | Example 6 | Example 7 | Example 8 | Example 9 |
|---|---|---|---|---|---|---|---|---|---|---|
| Pigment dispersion | Pigment dispersion A | 15 | 15 | 15 | 15 |  |  |  | 15 | 16 |
|  | Pigment dispersion B |  |  |  |  | 15 |  |  |  |  |
|  | Pigment dispersion C |  |  |  |  |  |  | 15 |  |  |
|  | Pigment dispersion D |  |  |  |  |  | 15 |  |  |  |
|  | 2-(2-Vinyloxyethoxy)ethyl acrylate | 42.9 | 65.9 | 69.9 | 32.9 | 65.9 | 80.9 | 80.9 | 60.9 | 55.9 |
|  | N-Vinyl caprolactam | 30 | 7 | 3 | 40 | 7 | 7 | 7 | 7 | 7 |
| Bifunctional monomer | Dipropylene glycol diacrylate |  |  |  |  |  |  |  | 5 | 10 |
|  | 1,6-Hexanediol diacrylate |  |  |  |  |  |  |  |  |  |
|  | 1,9-Nonanediol diacrylate |  |  |  |  |  |  |  |  |  |
|  | Tripropylene glycol diacrylate |  |  |  |  |  |  |  |  |  |
| Polyfunctional monomer | Trimethylol propane triacrylate |  |  |  |  |  |  |  |  |  |
|  | Pentaerythritol triacrylate |  |  |  |  |  |  |  |  |  |
|  | Dipenteerythritol hexaacrylate |  |  |  |  |  |  |  |  |  |
| Stabilizing agent | BHT SWANOX | 1 | 1 | 1 | 1 | 1 | 1 | 1 | 1 | 1 |
|  | Phenothiazine | 1 | 1 | 1 | 1 | 1 | 1 | 1 | 1 | 1 |
| Surface control agent | BYK UV3510 | 0.1 | 0.1 | 0.1 | 0.1 | 0.1 | 0.1 | 0.1 | 0.1 | 0.1 |
| Photopolymerization initiator | Lucirin TPO | 2.5 | 2.5 | 2.5 | 2.5 | 2.5 | 2.5 | 2.5 | 2.5 | 2.5 |
|  | IRGACURE 369 | 2.5 | 2.5 | 2.5 | 2.5 | 2.5 | 2.5 | 2.5 | 2.5 | 2.5 |
|  | IRGACURE 819 | 2.5 | 2.5 | 2.5 | 2.5 | 2.5 | 2.5 | 2.5 | 2.5 | 2.5 |
|  | KAYACURE BMS | 2.5 | 2.5 | 2.5 | 2.5 | 2.5 | 2.5 | 2.5 | 2.5 | 2.5 |
| Result of Evaluation | Curing property | ⊙ | ⊙ | ○ | ⊙ | ⊙ | ⊙ | ⊙ | ⊙ | ⊙ |
|  | Surface wrinkle | ○ | ○ | ○ | ○ | ⊙ | ⊙ | ⊙ | ○ | ⊙ |
|  | Discharge property | ⊙ | ⊙ | ⊙ | ○ | ⊙ | ⊙ | ⊙ | ⊙ | ⊙ |
|  | Scratch property | ○ | ○ | ○ | ○ | ○ | ○ | ○ | ○ | ○ |
|  | Storage stability | ⊙ | ⊙ | ⊙ | ○ | ⊙ | ⊙ | ⊙ | ⊙ | ⊙ |
|  | Adhesiveness PET | ⊙ | ⊙ | ⊙ | ⊙ | ⊙ | ⊙ | ⊙ | ⊙ | ⊙ |
|  | PP | ⊙ | ⊙ | ⊙ | ⊙ | ⊙ | ⊙ | ⊙ | ⊙ | ⊙ |
|  | Coated paper | ⊙ | ⊙ | ⊙ | ⊙ | ⊙ | ⊙ | ⊙ | ⊙ | ⊙ |
|  | PVC |  |  |  |  |  |  |  |  |  |

TABLE 2

Examples 10 to 17

|  |  | Example 10 | Example 11 | Example 12 | Example 13 | Example 14 | Example 15 | Example 16 | Example 17 |
|---|---|---|---|---|---|---|---|---|---|
| Pigment dispersion | Pigment dispersion A | 15 |  | 15 | 15 | 15 | 15 | 15 | 15 |
|  | Pigment dispersion B | 15 |  |  |  |  |  |  |  |
|  | Pigment dispersion C |  |  |  |  |  |  |  |  |
|  | Pigment dispersion D |  |  |  |  |  |  |  |  |
|  | 2-(2-Vinyloxyethoxy)ethyl acrylate | 10.9 | 20.9 | 47.9 | 47.9 | 20.9 | 27.9 | 17.9 | 22.9 |
|  | N-Vinyl caprolactam | 7 | 7 | 15 | 15 | 7 | 7 | 7 | 7 |
| Bifunctional monomer | Dipropylene glycol diacrylate | 25 | 25 |  |  |  | 35 | 35 | 35 |
|  | 1,6-Hexanediol diacrylate | 30 | 20 | 10 |  |  |  |  |  |
|  | 1,9-Nonanediol diacrylate |  |  |  | 10 |  |  |  |  |
|  | Tripropylene glycol diacrylate |  |  |  |  | 45 |  |  |  |
| Polyfunctional monomer | Trimethylol propane triacrylate |  |  |  |  |  | 3 |  |  |

TABLE 2-continued

| | | Example 10 | Example 11 | Example 12 | Example 13 | Example 14 | Example 15 | Example 16 | Example 17 |
|---|---|---|---|---|---|---|---|---|---|
| | Pentaerythritol triacrylate | | | | | | | 13 | |
| | Dipentaerythritol hexaacrylate | | | | | | | | 8 |
| Stabilizing agent | BHT SWANOX | 1 | 1 | 1 | 1 | 1 | 1 | 1 | 1 |
| | Phenothiazine | 1 | 1 | 1 | 1 | 1 | 1 | 1 | 1 |
| Surface control agent | BYK UV3510 | 0.1 | 0.1 | 0.1 | 0.1 | 0.1 | 0.1 | 0.1 | 0.1 |
| Photopolymerization initiator | Lucirin TPO | 2.5 | 2.5 | 2.5 | 2.5 | 2.5 | 2.5 | 2.5 | 2.5 |
| | IRGACURE 369 | 2.5 | 2.5 | 2.5 | 2.5 | 2.5 | 2.5 | 2.5 | 2.5 |
| | IRGACURE 819 | 2.5 | 2.5 | 2.5 | 2.5 | 2.5 | 2.5 | 2.5 | 2.5 |
| | KAYACURE BMS | 2.5 | 2.5 | 2.5 | 2.5 | 2.5 | 2.5 | 2.5 | 2.5 |
| Result of Evaluation | Curing property | ⊙ | ⊙ | ⊙ | ⊙ | ⊙ | ⊙ | ⊙ | ⊙ |
| | Surface wrinkle | ⊙ | ⊙ | ⊙ | ⊙ | ⊙ | ⊙ | ⊙ | ⊙ |
| | Discharge property | ⊙ | ⊙ | ⊙ | ○ | ○ | ⊙ | ○ | ⊙ |
| | Scratch property | ○ | ○ | ○ | ○ | ○ | ⊙ | ⊙ | ⊙ |
| | Storage stability | ⊙ | ⊙ | ⊙ | ⊙ | ⊙ | ⊙ | ⊙ | ⊙ |
| | Adhesiveness PET | ⊙ | ⊙ | ⊙ | ⊙ | ⊙ | ⊙ | ⊙ | ⊙ |
| | PP | ⊙ | ⊙ | ⊙ | ⊙ | ⊙ | ⊙ | ○ | ⊙ |
| | Coated paper | ⊙ | ⊙ | ⊙ | ⊙ | ⊙ | ⊙ | ⊙ | ⊙ |
| | PVC | ⊙ | ⊙ | ⊙ | ⊙ | ⊙ | ⊙ | ○ | ⊙ |

TABLE 3

Examples 1 to 10

| | | Comparative Example 1 | Comparative Example 2 | Comparative Example 3 | Comparative Example 4 | Comparative Example 5 |
|---|---|---|---|---|---|---|
| Pigment dispersion | Pigment dispersion A | 15 | | | | |
| | Pigment dispersion B | | 15 | | | |
| | Pigment dispersion C | | | | 15 | 15 |
| | Pigment dispersion D | | | | | |
| | 2-(2-Vinyloxyethoxy)ethyl acrylate | 72.9 | 72.9 | | | |
| | N-Vinyl caprolactam | | | 88 | | |
| Bifunctional monomer | Dipropylene glycol diacrylate | | | | | |
| | 1,6-Hexanediol diacrylate | | | | | |
| | 1,9-Nonanediol diacrylate | | | | | |
| | Tripropylene glycol diacrylate | | | | | 73 |
| Polyfunctional monomer | Trimethylol propane triacrylate | | | | | |
| | Pentaerythritol triacrylate | | | | | |
| | Dipenteerythritol hexaacrylate | | | | | |
| Stabilizing agent | BHT SWANOX | 1 | 1 | 1 | 1 | 1 |
| | Phenothiazine | 1 | 1 | 1 | 1 | 1 |
| Surface control agent | BYK UV3510 | 0.1 | 0.1 | 0.1 | 0.1 | 0.1 |
| Photopolymerization initiator | Lucirin TPO | 2.5 | 2.5 | 2.5 | 2.5 | 2.5 |
| | IRGACURE 369 | 2.5 | 2.5 | 2.5 | 2.5 | 2.5 |
| | IRGACURE 819 | 2.5 | 2.5 | 2.5 | 2.5 | 2.5 |
| | KAYACURE BMS | 2.5 | 2.5 | 2.5 | 2.5 | 2.5 |
| Result of Evaluation | Curing property | Δ | Δ | X | Δ | Δ |
| | Surface wrinkle | Δ | ○ | X | X | X |
| | Discharge property | ⊙ | ⊙ | ⊙ | ○ | Δ |
| | Scratch property | X | X | X | X | X |
| | Storage stability | ⊙ | ⊙ | X | Δ | Δ |
| | Adhesiveness PET | ○ | ○ | — | Δ | Δ |
| | PP | ○ | ○ | — | X | X |
| | Coated paper | ○ | ⊙ | — | ○ | ○ |
| | PVC | Δ | Δ | — | X | X |

| | | Comparative Example 6 | Comparative Example 7 | Comparative Example 8 | Comparative Example 9 | Comparative Example 10 |
|---|---|---|---|---|---|---|
| Pigment dispersion | Pigment dispersion A | | 15 | | 15 | 15 |
| | Pigment dispersion B | 15 | | | | |
| | Pigment dispersion C | 15 | | 15 | | |
| | Pigment dispersion D | | | | | |

TABLE 3-continued

Examples 1 to 10

| | | | | | | |
|---|---|---|---|---|---|---|
| | 2-(2-Vinyloxyethoxy)ethyl acrylate | | 37.9 | | 62.9 | 42.9 |
| | N-Vinyl caprolactam | | | 30 | | |
| Bifunctional monomer | Dipropylene glycol diacrylate | 58 | 35 | 43 | | |
| | 1,6-Hexanediol diacrylate | | | | | |
| | 1,9-Nonanediol diacrylate | | | | | |
| | Tripropylene glycol diacrylate | | | | | |
| Polyfunctional monomer | Trimethylol propane triacrylate | | | | | |
| | Pentaerythritol triacrylate | | | | | |
| | Dipenteerythritol hexaacrylate | 15 | | | 10 | 30 |
| Stabilizing agent | BHT SWANOX | 1 | 1 | 1 | 1 | 1 |
| | Phenothiazine | 1 | 1 | 1 | 1 | 1 |
| Surface control agent | BYK UV3510 | 0.1 | 0.1 | 0.1 | 0.1 | 0.1 |
| Photopolymerization initiator | Lucirin TPO | 2.5 | 2.5 | 2.5 | 2.5 | 2.5 |
| | IRGACURE 369 | 2.5 | 2.5 | 2.5 | 2.5 | 2.5 |
| | IRGACURE 819 | 2.5 | 2.5 | 2.5 | 2.5 | 2.5 |
| | KAYACURE BMS | 2.5 | 2.5 | 2.5 | 2.5 | 2.5 |
| Result of Evaluation | Curing property | ○ | Δ | Δ | Δ | ○ |
| | Surface wrinkle | ○ | X | Δ | Δ | ○ |
| | Discharge property | X | ⊙ | ⊙ | ⊙ | X |
| | Scratch property | ○ | X | X | X | ○ |
| | Storage stability | X | ⊙ | X | ⊙ | Δ |
| | Adhesiveness PET | X | ○ | X | ○ | X |
| | PP | X | ○ | X | ○ | X |
| | Coated paper | Δ | ○ | ○ | ○ | X |
| | PVC | X | X | ○ | Δ | X |

The Examples and Reference example described below relate to ink compositions containing a pigment dispersion prepared by using a polyethyleneimine resin as a pigment dispersing agent, a polymerizable compound, and a photopolymerization initiator.

1. Preparation of Pigment Dispersion

Before preparing the ink composition, the raw materials described in Table 4 were mixed according to the blending amount followed by dispersion for 1 hour using an Eiger mill to obtain each of Pigment dispersions A to SH. Dispersion was performed by using 1 mm diameter type Zr beads with volume filling ratio of 75%. Meanwhile, the dispersing resins of Table 4 that are used as a dispersing agent are as follows.

(Dispersing Resin)
 DR-A: SOLSPERSE J100 (manufactured by The Lubrizol Corporation), polyurethane based polyethyleneimine resin, solid content of 40% (phenoxyethyl acrylate cut).
 DR-B: SOLSPERSE 76500 (manufactured by The Lubrizol Corporation), polyurethane based polyethyleneimine resin, solid content of 50% (butyl acetate cut).
 DR-C: SOLSPERSE 76400 (manufactured by The Lubrizol Corporation), polyurethane based polyethyleneimine resin, solid content of 50% (manufactured by propylene glycol monomethyl ether acetate).
 DR-D: SOLSPERSE 32000 (manufactured by The Lubrizol Corporation), non-polyurethane based polyethyleneimine resin, solid content of 100%.

2. Preparation of Ink Composition

By slowly adding a mixture liquid of each polymerizable monomer described below as a polymerizable compound to 20 parts of each pigment dispersion prepared above followed by stirring, an ink precursor was obtained. After that, a polymerization initiator was added to the ink precursor and the polymerization initiator was dissolved by shaking for 6 hours using a shaker. The obtained liquid was filtered through a PTFE filter having pore diameter of 0.5 micron to remove coarse particles, and thus an ink composition was obtained.

For the preparation of the ink precursor, the polymerizable compound was prepared in advance and used as a mixture liquid of each polymerizable monomer.

(Monomer Mixture Liquid 1)
 Laromer DPGDA (manufactured by BASF SE) 40 parts
 VEEA (manufactured by NIPPON SHOKUBAI CO., LTD.) 40 parts (Monomer Mixture Liquid 2)
 Laromer DPGDA (manufactured by BASF SE) 40 parts
 Viscoat 260 (manufactured by OSAKA ORGANIC CHEMICAL INDUSTRY LTD) 40 parts (Monomer Mixture Liquid 3)
 Laromer DPGDA (manufactured by BASF SE) 70 parts
 V-Cap RC (manufactured by ISP) 10 parts (Monomer Mixture Liquid 4)
 VEEA-AI (manufactured by NIPPON SHOKUBAI CO., LTD.) 40 parts
 Viscoat 260 (manufactured by OSAKA ORGANIC CHEMICAL INDUSTRY LTD) 40 parts (Monomer Mixture Liquid 5)
 VEEA (manufactured by NIPPON SHOKUBAI CO., LTD.) 40 parts
 SR 595 (manufactured by Sartomer) 40 parts (Monomer Mixture Liquid 6)
 Laromer DPGDA (manufactured by BASF SE) 40 parts
 VEEA (manufactured by NIPPON SHOKUBAI CO., LTD.) 25 parts
 V-Cap RC (manufactured by ISP) 15 parts (Monomer Mixture Liquid 7)
 Laromer DPGDA (manufactured by BASF SE) 20 parts
 Viscoat 192 (manufactured by OSAKA ORGANIC CHEMICAL INDUSTRY LTD) 60 parts Details of each polymerizable monomer which has been used for preparing the monomer mixture liquid described above are as described below.

Laromer DPGDA: dipropylene glycol diacrylate
VEEA: 2-(2-vinyloxyethoxy)ethyl acrylate
Viscoat 260: 1,9-nonanediol diacrylate
SR 595: 1,10-nonanediol diacrylate
V-Cap RC: vinyl caprolactam
Viscoat 192: phenoxyethyl acrylate
(Dissolving of Polymerization Initiator)

To each ink precursor obtained by mixing the polymerizable monomer, the polymerization initiator was added to prepare an ink composition as described in Tables 5 and 6. Meanwhile, the polymerization initiator was prepared with three formulations that are expressed as addition examples 1, 2, and 3 described below, and each of them was used. Meanwhile, in Tables 5 and 6, corresponding to the formulation of the initiator used for preparing an ink composition (that is, numbers 1, 2, and 3 of the addition examples), the number like −1, −2, and −3 was also described behind the sample name of the ink precursor.
(Initiator Addition Example 1)
　Ink precursor 100 parts
　Darocur TPO (manufactured by BASF SE) 5 parts
　Irgacure 369 (manufactured by BASF SE) 5 parts
(Initiator Addition Example 2)
　Ink precursor (manufactured by BASF SE) 100 parts
　Darocur TPO (manufactured by BASF SE) 5 parts
　KAYACURE DETX-T (manufactured by Nippon Kayaku Co., Ltd.) 5 parts
(Initiator Addition Example 3)
　Ink precursor 100 parts
　Darocur TPO (manufactured by BASF SE) 5 parts
　Irgacure 907 (manufactured by BASF SE) 5 parts.

For each ink composition which has been prepared as described above, various evaluations were performed as follows. Results of the evaluations are presented in Tables 5 and 6.
(Viscosity Measurement)

Viscosity of the prepared ink was measured by using type E viscometer manufactured by TOKI SANGYO CO., LTD. With regard to the measurement conditions, revolution number suitable for the measurement was obtained in a circulating chiller at 25° C., and the measurement value after 3 minutes was used as the viscosity.
(Evaluation of Discharge Property)

The frequency characteristics were evaluated by observation according to strobe filming of the ink discharged by using a head manufactured by KYOCERA Corporation (KJ4A). The wave form selected was Fire 1 mode. Points for evaluation include the start of discharge when the frequency is changed to 5 kHz, and 20 kHz and after continuous discharge for 10 minutes. Separation of liquid ink droplets was observed for each case. Specifically, based on evaluation of separated droplets, the responsiveness to frequency and discharge property were determined. For the evaluation of separated droplets, shape of the liquid ink droplets was observed for each of the 1 mm and 2 mm time points after the discharge. The liquid ink droplets preferably show no occurrence of separation and also have the stability. The criteria for evaluation are as follows.
(Criteria for Evaluation)
　○: No separation until 2 mm, and thus continuous and stable.
　Δ: Separation was observed at 1 mm, but the liquid droplets were integrated at 2 mm. Alternatively, the separation state was greatly changed from the beginning.
　X: Separation was observed at 1 mm, and no liquid droplets were integrated at 2 mm. There was an occurrence of poor discharge at the beginning or after 10 minutes.
(Evaluation of Printing)

The ink prepared above was added in a head of an inkjet printer, and the evaluation of the printing was performed. Specifically, the evaluation of the printing was performed by using a single pass type inkjet printer (manufactured by TRYTECH Co., Ltd.) which is equipped with a discharge device having a head (KJ4A) manufactured by KYOCERA Corporation, a device for returning the substrate with shot from a conveyor part at desired speed, and a device for continuous irradiation by UV lamp. With regard to the UV lamp, the evaluation was made at two levels including a metal halide lamp of 140 W/cm manufactured by Nordson KK and an LED lamp (385 nm, integrated light amount of 566 mw/cm$^2$ at 10 m/sec) manufactured by Integration Technology. The head temperature was uniformly set at 40° C. at the time of discharge. As for the printing material, OK Topcoat Plus (manufactured by OJI PAPER CO., LTD.) was used. With the printed materials obtained therefrom, the curing property and shot accuracy were evaluated as follows.

Curing property: The curing property of the ink at the time of changing the conveyor speed to 25 m/min or 50 m/min was determined by hand touch method. The criteria for evaluation are as follows.
(Evaluation Criteria for Curing Property)
　○: No smearing occurred even after strong rubbing.
　Δ: Although there was curing, slight smearing occurred by strong rubbing.
　X: There was no curing (ink was transferred on fingers).
Shot accuracy: When good discharge state of discharge speed is not obtained, the linear imaging quality is deteriorated. In this case, a bar code was printed, and the deviation level in horizontal lines that are along the flow of printing was evaluated by using a bar code tester QC890 (manufactured by Honeywell International, Inc). The criteria for evaluation are as follows. "A" and "B" are the practically allowed levels.
(Evaluation Criteria for Shot Accuracy)
　A: A level readable by a scan
　B: A level readable by 1 to 2 scans
　C: A level readable by further increasing the scans
　D: A level possibly readable with plural scanning lines
　F: A level mostly with reading failure.

TABLE 4

Pigment dispersions

| Pigment dispersion | Color Index | Pigment | Manufacturer | Blending amount | Dispersing resin | Blending amount | P/R | Dispersion monomer | Blending amount |
|---|---|---|---|---|---|---|---|---|---|
| A | Pigment Violet 19 | Hostaperm Red E5B 02 | Clariant | 20.0 | DR-A | 12.5 | 25.0% | DPGDA | 67.5 |
| B | Pigment Violet 19 | Hostaperm Red E5B 02 | Clariant | 20.0 | DR-A | 37.5 | 75.0% |  | 42.6 |
| C | Pigment Violet 19 | Hostaperm Red E5B 02 | Clariant | 20.0 | DR-A | 25.0 | 50.0% |  | 55.0 |
| D | Pigment Red 122 | Hostaperm Pink E | Clariant | 20.0 | DR-A | 12.5 | 25.0% |  | 67.5 |
| E | Pigment Red 176 | Novoperm Carmine HF3C | Clariant | 20.0 | DR-A | 12.5 | 25.0% |  | 67.5 |

TABLE 4-continued

Pigment dispersions

| Pigment dispersion | Color Index | Pigment | Manufacturer | Blending amount | Dispersing resin | Blending amount | P/R | Dispersion monomer | Blending amount |
|---|---|---|---|---|---|---|---|---|---|
| F | Pigment Red 185 | Novoperm Carmine HF4C | Clariant | 20.0 | DR-A | 12.5 | 25.0% | | 67.5 |
| G | Pigment Red 202 | Sunfast Magenta 202 | SUN Chemical | 20.0 | DR-A | 12.5 | 25.0% | | 67.5 |
| H | Pigment Red 269 | Fabriperm Naphthol Red 238-T | Fabricolor | 20.0 | DR-A | 12.5 | 25.0% | | 67.5 |
| J | Pigment Yellow 120 | Novoperm Yellow H2G | Clariant | 20.0 | DR-A | 12.5 | 25.0% | | 67.5 |
| K | Pigment Yellow 139 | Palitol Yellow D 1819 | BASF | 20.0 | DR-A | 12.5 | 25.0% | | 67.5 |
| L | Pigment Yellow 150 | Lionogen Yellow ID250 | TOYOCHEM | 20.0 | DR-A | 12.5 | 25.0% | | 67.5 |
| M | Pigment Yellow 151 | Hostaperm Yellow H4G | Clariant | 20.0 | DR-A | 12.5 | 25.0% | | 67.5 |
| N | Pigment Yellow 155 | PV Fast Yellow 4GP | Clariant | 20.0 | DR-A | 12.5 | 25.0% | | 67.5 |
| O | Pigment Yellow 180 | Novoperm Yellow P-HG | Clariant | 20.0 | DR-A | 12.5 | 25.0% | | 67.5 |
| P | Pigment Yellow 185 | Palltol Yellow D 1155 | BASF | 20.0 | DR-A | 12.5 | 25.0% | | 67.5 |
| Q | Pigment Blue 15:3 | Lionol Blue 7351 | TOYOCHEM | 20.0 | DR-A | 12.5 | 25.0% | | 67.5 |
| R | Pigment Blue 15:4 | Lionel Blue 7400G | TOYOCHEM | 20.0 | DR-A | 12.5 | 25.0% | | 67.5 |
| S | Pigment Black 7 | Special Black 350 | EVONIK DEGUSSA | 20.0 | DR-A | 12.5 | 25.0% | | 67.5 |
| T | Pigment White 6 | TIPAQUE PF-740 | Ishihara Sangyo | 20.0 | DR-A | 12.5 | 25.0% | | 67.5 |
| U | Pigment Green 7 | LIONOL GREEN 8930 | TOYOCHEM | 20.0 | DR-B | 10.0 | 25.0% | | 70.0 |
| V | Pigment Green 36 | LIONOL GREEN 2Y-301 | TOYOCHEM | 20.0 | DR-B | 10.0 | 25.0% | | 70.0 |
| W | Pigment Orange 43 | Hostaperm Orange GR | Clariant | 20.0 | DR-C | 10.0 | 25.0% | | 70.0 |
| X | Pigment Violet 23 | LIONOGEN VIOLET-FG6141G | TOYOCHEM | 20.0 | DR-C | 10.0 | 25.0% | | 70.0 |
| AH | Pigment Violet 19 | Hostaperm Red E5B 02 | Clariant | 20.0 | DR-D | 5.0 | 25.0% | DPGDA | 75.0 |
| DH | Pigment Red 122 | Hostaperm Pink E | Clariant | 20.0 | DR-D | 5.0 | 25.0% | | 75.0 |
| LH | Pigment Yellow 150 | Lionogen Yellow ID250 | TOYOCHEM | 20.0 | DR-D | 5.0 | 25.0% | | 75.0 |
| OH | Pigment Yellow 180 | Novoperm Yellow P-HG | Clariant | 20.0 | DR-D | 5.0 | 25.0% | | 75.0 |
| RH | Pigment Blue 15:4 | Lionol Blue 7400G | TOYOCHEM | 20.0 | DR-D | 5.0 | 25.0% | | 75.0 |
| SH | Pigment Black 7 | Specla Black 350 | EVONIK DEGUSSA | 20.0 | DR-D | 5.0 | 25.0% | | 75.0 |

TABLE 5

Examples - Ink compositions

| Example Ink | Color Index | Dispersing resin | Monomer mixture | Initiator addition liquid | Ink example | Ink viscosity | Discharge property 5 KHz | Discharge property 20 KHz | Curing property Metal halide 25 m/min | Curing property Metal halide 50 m/min | Curing property LED 25 m/min | Curing property LED 50 m/min | Shot accuracy |
|---|---|---|---|---|---|---|---|---|---|---|---|---|---|
| A1-1 | Pigment Violet 19 | DR-A | 1 | 1 | | 9.5 | ○ | ○ | ○ | ○ | ○ | ○ | A |
| B1-2 | Pigment Violet 19 | DR-A | 1 | 2 | | 13.3 | ○ | ○ | ○ | ○ | ○ | ○ | B |
| C1-3 | Pigment Violet 19 | DR-A | 1 | 3 | | 11.0 | ○ | ○ | ○ | ○ | ○ | Δ | B |
| D2-1 | Pigment Red 122 | DR-A | 2 | 1 | | 12.3 | ○ | ○ | ○ | ○ | ○ | ○ | B |
| E2-1 | Pigment Red 176 | DR-A | 2 | 1 | | 13.1 | ○ | ○ | ○ | ○ | ○ | ○ | B |
| F2-1 | Pigment Red 185 | DR-A | 2 | 1 | | 11.5 | ○ | ○ | ○ | ○ | ○ | ○ | B |
| G3-1 | Pigment Red 202 | DR-A | 3 | 1 | | 10.8 | ○ | ○ | ○ | ○ | ○ | ○ | B |
| H3-1 | Pigment Red 269 | DR-A | 3 | 1 | | 11.1 | ○ | ○ | ○ | ○ | ○ | ○ | B |
| J3-1 | Pigment Yellow 120 | DR-A | 3 | 1 | | 10.2 | ○ | ○ | ○ | ○ | ○ | ○ | B |
| K4-1 | Pigment Yellow 139 | DR-A | 4 | 1 | | 6.2 | ○ | ○ | ○ | ○ | ○ | ○ | A |
| L4-1 | Pigment Yellow 150 | DR-A | 4 | 1 | | 7.5 | ○ | ○ | ○ | ○ | ○ | ○ | A |
| M4-1 | Pigment Yellow 151 | DR-A | 4 | 1 | | 7.3 | ○ | ○ | ○ | ○ | ○ | ○ | A |
| N5-1 | Pigment Yellow 155 | DR-A | 5 | 1 | | 6.8 | ○ | ○ | ○ | ○ | ○ | ○ | A |
| O5-1 | Pigment Yellow 180 | DR-A | 5 | 1 | | 8.2 | ○ | ○ | ○ | ○ | ○ | ○ | A |
| P5-1 | Pigment Yellow 185 | DR-A | 5 | 1 | | 6.1 | ○ | ○ | ○ | ○ | ○ | ○ | A |
| Q6-1 | Pigment Blue 15:3 | DR-A | 6 | 1 | | 10.5 | ○ | ○ | ○ | ○ | ○ | ○ | B |
| R6-1 | Pigment Blue 15:4 | DR-A | 6 | 1 | | 10.4 | ○ | ○ | ○ | ○ | ○ | ○ | B |
| S6-1 | Pigment Black 7 | DR-A | 6 | 1 | | 9.9 | ○ | ○ | ○ | ○ | ○ | ○ | A |
| T6-1 | Pigment White 6 | DR-A | 6 | 1 | | 9.5 | ○ | ○ | ○ | ○ | ○ | ○ | A |
| U7-1 | Pigment Green 7 | DR-B | 7 | 1 | | 13.5 | ○ | ○ | ○ | ○ | ○ | ○ | B |
| V7-1 | Pigment Green 36 | DR-B | 7 | 1 | | 13.1 | ○ | ○ | ○ | ○ | ○ | ○ | B |
| W7-1 | Pigment Orange 43 | DR-C | 7 | 1 | | 13.5 | ○ | ○ | ○ | ○ | ○ | ○ | B |
| X7-1 | Pigment Violet 23 | DR-C | 7 | 1 | | 13.7 | ○ | ○ | ○ | ○ | ○ | ○ | B |

TABLE 6

Reference examples - Ink compositions

| Reference example Ink | Color Index | Dispersing resin | Monomer mixture liquid | Initiator addition example | Ink viscosity | Discharge property 5 KHz | Discharge property 20 KHz | Curing property Metal halide 25 m/min | Curing property Metal halide 50 m/min | Curing property LED 25 m/min | Curing property LED 50 m/min | Shot accuracy |
|---|---|---|---|---|---|---|---|---|---|---|---|---|
| AH1-1 | Pigment Violet 19 | DR-D | 1 | 1 | 10.5 | ○ | X | ○ | ○ | ○ | ○ | C |
| B7-1 | Pigment Violet 19 | DR-A | 7 | 1 | 14.9 | ○ | △ | ○ | ○ | ○ | ○ | F |
| DH | Pigment Red 122 | DR-D | 2 | 2 | 13.1 | ○ | X | ○ | ○ | ○ | ○ | D |
| LH | Pigment Yellow 150 | DR-D | 4 | 3 | 8.1 | ○ | X | ○ | ○ | ○ | △ | B |
| OH | Pigment Yellow 180 | DR-D | 5 | 1 | 8.3 | ○ | X | ○ | ○ | ○ | ○ | B |
| RH | Pigment Blue 15:4 | DR-D | 8 | 2 | 10.8 | ○ | X | ○ | ○ | ○ | ○ | C |
| SH | Pigment Black 7 | DR-D | 7 | 3 | 10.8 | ○ | X | ○ | ○ | ○ | △ | C |

The invention claimed is:

1. An active energy ray-curable inkjet ink composition comprising at least two types of polymerizable compounds selected from the group consisting of
   (A) 2-(2-vinyloxyethoxy) ethyl acrylate,
   (B) N-vinyl caprolactam, and
   (C) a bifunctional acrylate monomer comprising a diacrylate and having a molecular weight of 250 or less,
   said composition further comprising a pigment and a pigment dispersing agent, wherein the pigment dispersing agent is a comb type resin dispersing agent comprising polyethyleneimine as a main skeleton and a urethane skeleton as a side chain.

2. The inkjet ink composition according to claim 1, comprising (A) 2-(2-vinyloxyethoxy) ethyl acrylate and (B) N-vinyl caprolactam.

3. The inkjet ink composition according to claim 2, wherein a content of (B) N-vinyl caprolactam is 3 to 40% by weight based on a total weight of the ink composition.

4. The inkjet ink composition according to claim 1, comprising (A), (B) and (C).

5. The inkjet ink composition according to claim 2, further comprising (D) a polyfunctional acrylate monomer with a functionality of 3 or more.

6. The inkjet ink composition according to claim 1, wherein the urethane skeleton in the comb type resin dispersing comprises a component comprising tolylene diisocyanate as an isocyanate component and propylene glycol, ethylene glycol, or both, as an alcohol component.

7. The inkjet ink composition according to claim 1, having a viscosity at 25° C. of 5 to 14 mPa·s.

8. A printed material obtained by printing the ink composition according to claim 1 on a substrate.

9. The inkjet ink composition according to claim 3, further comprising (D) a polyfunctional acrylate monomer with a functionality of 3 or more.

10. The inkjet ink composition according to claim 4, further comprising (D) a polyfunctional acrylate monomer with a functionality of 3 or more.

11. The inkjet ink composition according to claim 1, comprising (A) and (C).

12. The inkjet ink composition according to claim 1, comprising (B) and (C).

* * * * *